United States Patent
Zhang et al.

(10) Patent No.: US 11,183,155 B2
(45) Date of Patent: Nov. 23, 2021

(54) ADAPTIVE IMAGE DATA BIT-DEPTH ADJUSTMENT SYSTEMS AND METHODS

(71) Applicant: Apple Inc., Cupertino, CA (US)

(72) Inventors: Sheng Zhang, Sunnyvale, CA (US); Chaohao Wang, Sunnyvale, CA (US); Shilin Zhu, San Diego, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/870,197

(22) Filed: May 8, 2020

(65) Prior Publication Data

US 2020/0365118 A1    Nov. 19, 2020

Related U.S. Application Data

(60) Provisional application No. 62/849,017, filed on May 16, 2019.

(51) Int. Cl.
   *G09G 5/39*    (2006.01)
   *G06N 3/02*    (2006.01)
   *G06T 1/60*    (2006.01)
   *G09G 5/00*    (2006.01)

(52) U.S. Cl.
   CPC .............. *G09G 5/39* (2013.01); *G06N 3/02* (2013.01); *G06T 1/60* (2013.01); *G09G 5/003* (2013.01); *G06T 2207/20081* (2013.01); *G06T 2207/20084* (2013.01); *G09G 2320/0626* (2013.01)

(58) Field of Classification Search
   None
   See application file for complete search history.

(56) References Cited

U.S. PATENT DOCUMENTS

| | | | |
|---|---|---|---|
| 2005/0152614 A1* | 7/2005 | Daly | H04N 19/42 382/268 |
| 2006/0233438 A1* | 10/2006 | Xu | G09G 3/2051 382/162 |
| 2010/0066912 A1* | 3/2010 | Kumwilaisak | H04N 19/154 348/607 |
| 2010/0134496 A1* | 6/2010 | Bhaskaran | G06T 3/403 345/428 |
| 2014/0184626 A1* | 7/2014 | Narayanan | G09G 5/391 345/545 |
| 2015/0339994 A1* | 11/2015 | Verbeure | G09G 3/2044 345/214 |

(Continued)

*Primary Examiner* — Joni Hsu
(74) *Attorney, Agent, or Firm* — Fletcher Yoder, P.C.

(57) ABSTRACT

Systems and methods for improving perceived image quality with reduced implementation associated cost and/or improved operational efficiency. A display pipeline includes an input buffer that stores input image data corresponding with an image pixel window, in which the input image data has a first bit-depth and includes image data corresponding with an image pixel in the image pixel window. The display pipeline includes bit-depth adjustment circuitry, which includes a neural network that operates based on a set of bit-depth adjustment parameters to process the input image data to determine whether banding greater than a perceivability threshold is expected to result when the image is displayed directly using the input image data with the first bit-depth and to process the image data corresponding with the image pixel to expand the image data from the first bit-depth to a second bit-depth when the banding visual artifact is greater than the perceivability threshold.

20 Claims, 10 Drawing Sheets

(56) References Cited

U.S. PATENT DOCUMENTS

| | | | | |
|---|---|---|---|---|
| 2016/0323524 A1* | 11/2016 | Smith | ............... | H04N 5/23245 |
| 2017/0351893 A1* | 12/2017 | Schneider | .......... | G06K 7/10722 |
| 2019/0104309 A1* | 4/2019 | Su | .......................... | H04N 19/37 |
| 2020/0242730 A1* | 7/2020 | Shiokawa | ................. | G06T 3/40 |
| 2020/0364833 A1* | 11/2020 | Zhao | ........................ | G06N 3/02 |

* cited by examiner

ADAPTIVE IMAGE DATA BIT-DEPTH ADJUSTMENT SYSTEMS AND METHODS

CROSS-REFERENCE TO RELATED APPLICATIONS

This application claims priority to and the benefit of U.S. Provisional Application No. 62/849,017, filed May 16, 2019, and entitled, "ADAPTIVE IMAGE DATA BIT-DEPTH ADJUSTMENT SYSTEMS AND METHODS," which is incorporated herein by reference in its entirety for all purposes.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure generally relates to electronic displays and, more particularly, to processing performed on image data before the image data is used to display a corresponding image on an electronic display. Generally, an electronic display may operate to display an image by controlling light emission from its display pixels based on image data that indicates target grayscale (e.g., luminance or brightness) values of corresponding image pixels in the image. Additionally, image data may generally be generated and output by an image source, such as a graphics processing unit (GPU) and/or an image sensor (e.g., camera). However, at least in some instances, displaying an image directly using source image data output from an image source may affect perceived quality of the image and, thus, potentially an electronic display that is displaying the image.

Accordingly, to facilitate improving perceived image quality, the present disclosure describes techniques for implementing and/or operating image processing circuitry to process image data before the image data is used to display a corresponding image. In some embodiments, the image processing circuitry may be implemented at least in part in a display pipeline communicatively coupled between an image source and a display panel of an electronic display, for example, as a part of a system-on-chip (SoC). Additionally, to facilitate reducing likelihood and/or perceivability of banding visual artifacts, the image processing circuitry may include bit-depth adjustment circuitry that operates to adaptively adjust bit-depth of source image data, for example, before subsequent processing and/or supply to the display panel.

Since banding visual artifacts often occur in gradient content, in some embodiments, the bit-depth adjustment circuitry may process source image data corresponding with a window (e.g., group or block) of image pixels. As such, to facilitate adjusting bit-depth, the bit-depth adjustment circuitry may be coupled to an input buffer, for example, implemented in a display pipeline along with the bit-depth adjustment circuitry. However, at least in some instances, storage capacity of an input buffer may affect implementation associated cost of the display pipeline, for example, due to physical size (e.g., footprint) of the input buffer being increased to accommodate a larger storage capacity.

To facilitate reducing implementation associated cost, in some embodiments, the bit-depth adjustment circuitry may utilize machine learning techniques to adaptively adjust source image data bit-depth using smaller image pixel windows, which, at least in some instances, may enable the input buffer to be implemented with a smaller storage capacity. For example, the bit-depth adjustment circuitry may include a neural network, such as a convolutional neural network (CNN), that operates to analyze source image data corresponding with a window (e.g., group or block) of image pixels to determine whether perceivable banding (e.g., bit-depth visual artifact) is expected in the window and adjust (e.g., increase or expand) bit-depth of source image data corresponding with one or more image pixels in the window when perceivable banding is expected. In fact, in some embodiments, implementing machine learning techniques, such as a neural network, may enable the bit-depth adjustment circuitry to adaptively (e.g., selectively) adjust bit-depth of source image data without explicitly determining gradient across an image pixel window, which, at least in some instances, may enable the bit-depth adjustment circuitry to analyze smaller image pixel windows, for example, compared to traditional gradient calculation and banding removal techniques.

To facilitate adaptively adjusting operation, in some embodiments, operation of the bit-depth adjustment circuitry may be controlled based at least in part on bit-depth adjustment parameters. For example, a set of bit-depth adjustment parameters may indicate convolution weights and/or layer interconnections to be implemented in a neural network in the bit-depth adjustment circuitry. As such, at least in some instances, performance (e.g., operational efficiency and/or banding removal effectiveness) of the bit-depth adjustment circuitry may be dependent at least in part on the implemented bit-depth adjustment parameters.

To facilitate improving performance, in some embodiments, bit-depth adjustment parameters to be implemented by bit-depth adjustment circuitry may be calibrated (e.g., tuned or trained) using a calibration (e.g., training or tuning) process, for example, performed by a calibration system offline before deployment (e.g., runtime) and/or periodically after deployment. In some embodiments, a calibration process may include determining reference image data that has a higher bit-depth than source image data expected to be output from an image source. Additionally, the calibration process may include truncating the reference image data to the expected bit-depth of source image data. Furthermore, the calibration process may include inputting the truncated version of the reference image data into the bit-depth adjustment circuitry and operating the bit-depth adjustment circuitry using a current set of bit adjustment parameters to generate a recovered version of the reference image data, which has a higher bit-depth than the expected bit-depth of source image data.

In some embodiments, the bit-depth adjustment circuitry may generate the recovered version of the reference image data such that bit-depth of the recovered version matches bit-depth of an original (e.g., un-truncated) version of the reference image data. In this manner, performance (e.g., operational efficiency and/or banding removal effectiveness) of the bit-depth adjustment circuitry using the current set of bit-depth adjustment parameters may be evaluated, for example, at least in part by comparing a recovered version of the reference image data with an original version of the reference image data. In fact, in some embodiments, the calibration process may include adaptively adjusting the current value of one or more bit-depth adjustment parameters based at least in part on the performance of the bit-depth adjustment circuitry. For example, the value of one or more bit-depth adjustment parameters may be adjusted when the current set of bit-depth adjustment parameters is expected to result in a banding visual artifact above a perceivability threshold.

Since processing image data generally consumes electrical power, to facilitate improving operational efficiency, in some embodiments, bit-depth adjustment circuitry may selectively adjust bit-depth of source image data. In other words, in such embodiments, the bit-depth adjustment circuitry may adjust bit-depth of some source image data, but leave bit-depth of other source image data unchanged. To facilitate selectively performing bit-depth adjustments, in some embodiments, a set of bit-depth adjustment parameters may include one or more detection parameters to be used by the bit-depth adjustment circuitry to detect perceivability of banding and, thus, whether a bit-depth adjust should be performed.

Moreover, at least in some instances, operational efficiency of bit-depth adjustment circuitry may be affected by the bit-depth of output image data. As such, to facilitate improving operational efficiency, in some embodiments, the bit-depth adjustment circuitry may selectively vary bit-depth of output image data. To facilitate selectively varying bit-depth adjustments, in some embodiments, a set of bit-depth adjustment parameters may include one or more adjustment parameters to be used by the bit-depth adjustment circuitry to adjust bit-depth of source image data, for example, when, based on one or more detection parameters included in a current set of bit-depth adjustment parameters, the bit-depth adjustment circuitry determines that a bit-depth adjustment should be performed.

As an illustrative example, the adjustment parameters may indicate a target bit-depth of image data to be output from the bit-depth adjustment circuitry. In some embodiments, the target bit-depth may be pre-determined, for example, offline. Additionally or alternatively, the target bit-depth may be determined at least in part online, for example, during operation (e.g., runtime) of the bit-depth adjustment circuitry and/or its neural network. In particular, in some embodiments, a set of bit-depth adjustment parameters may indicate multiple candidate bit-depths from which the target output bit-depth is selected.

Since operational efficiency of a bit-depth adjustment circuitry is generally dependent on output bit-depth, in some embodiments, the bit-depth adjustment circuitry may attempt to select a lower candidate bit-depth as the target output bit-depth over a higher candidate bit-depth. In other words, in some embodiments, the bit-depth adjustment circuitry may evaluate the candidate bit-depths in ascending order. For example, the bit-depth adjustment circuitry may evaluate a candidate bit-depth by determining whether selection of the candidate bit-depth as the target bit-depth is expected to result in banding perceivability that is not greater than a perceivability threshold. In this manner, the techniques described in the present disclosure may facilitate improving perceived quality of a displayed image and, thus, potentially an electronic display that is displaying the image with reduced implementation associated cost and/or improved operational efficiency, for example, by enabling bit-depth adjustments to be adaptively (e.g., selectively or intelligently) performed using smaller image pixel windows and, thus, a smaller input buffer.

BRIEF DESCRIPTION OF THE DRAWINGS

Various aspects of the present disclosure may be better understood upon reading the following detailed description and upon reference to the drawings in which.

DETAILED DESCRIPTION

Figure 1:
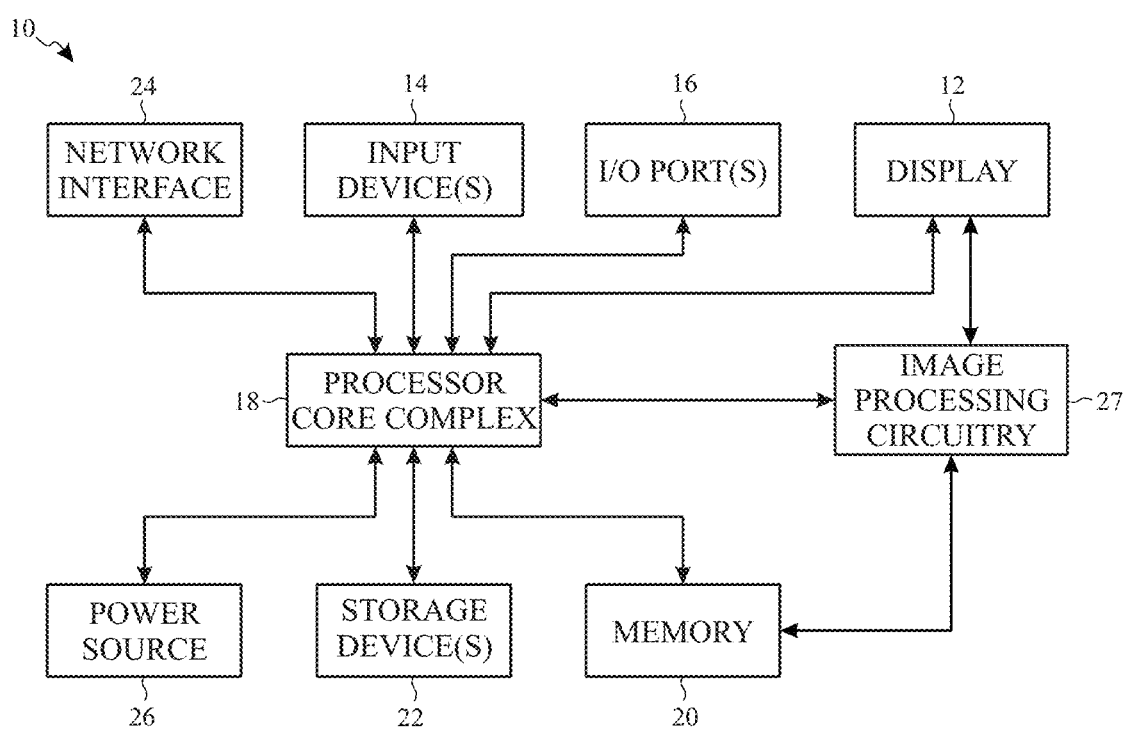
FIG. 1 is a block diagram of an electronic device including an electronic display, in accordance with an embodiment of the present disclosure.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The present disclosure generally relates to electronic displays, which may be used to present visual representations of information as one or more images (e.g., image frames and/or pictures). Accordingly, electronic devices, such as computers, mobile phones, portable media devices, tablets, televisions, virtual-reality headsets, and vehicle dashboards, among many others, often include and/or utilize one or more electronic displays. To display an image, an electronic display may control light emission from its display pixels based at least in part on image data, which indicates target characteristics of the image. For example, image data may indicate target luminance (e.g., brightness or grayscale value) at various points (e.g., image pixels) in the image content.

Generally, image data may be generated and output by an image source, such as a graphics processing unit (GPU) and/or an image sensor (e.g., camera). However, at least in some instances, image sources may output image data using different formats. For example, a first image source may output image data using an alpha-red-green-blue (αRGB) format, which includes an alpha component, a red component, a green component, and a blue component, while a second image source outputs image data using a luma-chroma-chroma (YCbCr) format, which includes a luma component, a blue-chroma component, and a red-chroma component. Additionally or alternatively, the first image source may output image data using a fixed point representation while the second image source outputs image data using a floating point representation.

Regardless of image data format, at least in some instances, image sources may be implemented to output image data with a fixed bit-depth, for example, due to hardware constraints, such as number of output pins implemented in an image source. To help illustrate, continuing with the above example, the first image source may output 8-bit αRGB image data. Additionally or alternatively, the second image may output 8-bit YCbCr image data.

However, at least in some instances, directly using source image data output from an image source to display a corresponding image may affect perceived quality of the image and, thus, potentially of an electronic display that is displaying the image. In particular, at least in some instances, directly using source image data to display a corresponding image may result in the image being displayed with one or more perceivable visual artifacts (e.g., distortions relative to original image content), thereby reducing perceived image quality. For example, displaying an image directly using 8-bit source image data may result in a perceivable banding visual artifact in a portion of the displayed image that includes gradient image content, such as a blue sky.

Accordingly, to facilitate improving perceived image quality, the present disclosure describes techniques for implementing and/or operating image processing circuitry to process image data before the image data is used to display a corresponding image, for example, to facilitate reducing likelihood and/or perceivability of visual artifacts, such as banding, occurring in the image. In some embodiments, image processing circuitry may be implemented at least in part in a display pipeline communicatively coupled between an image source and a display panel of an electronic display, for example, as a part of a system-on-chip (SoC). Additionally, to facilitate improving perceived image quality, the image processing circuitry may process image data output from the image source before supply to the display panel, for example, to account for factors that potentially affect perceived luminance and, thus, perceived image quality, such as panel temperature, display pixel burn-in, display sub-pixel layout, ambient lighting conditions, display panel bit-depth compatibility, and/or source image data bit-depth.

As described above, perceived quality of an image and, thus, potentially an electronic display that is displaying the image may be reduced when the image is displayed with one or more perceivable visual artifacts, such as banding. Additionally, as described above, likelihood and/or perceivability of banding visual artifacts occurring in a displayed image may increase when the image is displayed directly using fixed bit-depth source image data output from an image source. In particular, bit-depth of image data generally limits the number of different grayscale (e.g., luminance or brightness) values indicatable by the image data. For example, 8-bit fixed point image data may indicate two hundred fifty six different grayscale values.

However, actual image content, such as a picture of the sky, often utilizes more grayscale values than are indicatable by fixed bit-depth image data. As such, in some embodiments, source image data output from an image source may be generated at least in part by mapping (e.g., rounding) the actual image content to grayscale values indicatable by the bit-depth of the source image data. In other words, at least in such embodiments, grayscale values indicated by the source image data may differ slightly from the actual image content, which, when perceivable, results in one or more perceivable visual artifacts. For example, source image data corresponding with adjacent image pixels in gradient image content, which have slightly different grayscale values in the actual image content, may nevertheless be mapped to the same grayscale value, thereby potentially resulting in one or more perceivable banding visual artifacts.

To facilitate reducing likelihood and/or perceivability of visual artifacts, in some embodiments, the image processing circuitry may include a bit-depth adjustment block (e.g., circuitry group, unit, or module), which operates to adjust bit-depth of source image data before subsequent processing, for example, by one or more downstream image processing blocks implemented in a display pipeline. As described above, visual artifacts, such as banding, often occurs in gradient image content due to the limited number of grayscale values indicatable by corresponding image data. Thus, to facilitate reducing likelihood and/or perceivability of visual artifacts, in some embodiments, the bit-depth adjustment block may process source image data corresponding with a window (e.g., group or block) of image pixels to determine gradient across the window and adjust bit-depth accordingly.

As such, to facilitate adjusting bit-depth, the image processing circuitry may be coupled to an input buffer, for example, implemented in a display pipeline along with the image processing circuitry and an output buffer coupled to a display panel. In other words, in some embodiments, storage capacity of an input buffer may be sized to enable storage of sufficient source image data for gradient determination. However, at least in some instances, storage capacity of an input buffer may affect implementation associated cost. For example, physical size (e.g., footprint) of the input buffer may be increased to accommodate a larger storage capacity, which, at least in some instances, may reduce space (e.g., real estate) available for implementing the image processing circuitry and/or increase physical size of the display pipeline. On the other hand, decreasing storage capacity may enable physical size of the input buffer to be reduced, which, at least in some instances, may increase space available for implementing the image processing circuitry and/or enable physical size of the display pipeline to be reduced.

To facilitate reducing implementation associated cost, in some embodiments, the bit-depth adjustment block may utilize machine learning techniques to adaptively adjust source image data bit-depth using smaller image pixel windows, which, at least in some instances, may enable the input buffer to be implemented with a smaller storage capacity. For example, the bit-depth adjustment block may include a neural network, such as a convolutional neural network (CNN), that operates to analyze source image data corresponding with a window (e.g., group or block) of image pixels to determine whether perceivable banding is expected in the window and adjust (e.g., increase or expand) bit-depth of source image data corresponding with one or more image pixels in the window when perceivable banding is expected. In fact, in some embodiments, implementing machine learning techniques, such as a neural network, may enable the bit-depth adjustment block to adaptively (e.g., selectively) adjust bit-depth of source image data without explicitly determining gradient across an image pixel window, which, at least in some instances, may enable the bit-depth adjustment block to analyze smaller image pixel windows, for example, compared to traditional gradient calculation and banding removal techniques.

To facilitate adaptively adjusting operation, in some embodiments, operation of image processing circuitry, such as the bit-depth adjustment block, may be controlled based at least in part on corresponding processing parameters. For example, a set of bit-depth adjustment parameters may indicate convolution weights and/or layer interconnections to be implemented in a neural network of the bit-depth adjustment block. As such, at least in some instances, performance (e.g., operational efficiency and/or banding removal effectiveness) of the bit-depth adjustment block may be dependent at least in part on its bit-depth adjustment parameters.

To facilitate improving performance, in some embodiments, bit-depth parameters to be implemented by a bit-depth adjustment block may be calibrated (e.g., tuned or trained) using a calibration (e.g., training or tuning) process, for example, performed by a calibration system offline before deployment and/or periodically after deployment. In some embodiments, a calibration process may include determining reference image data that has a higher bit-depth than source image data expected to be output from an image source. For example, when the image source is expected to output 8-bit image data, the reference image data may include 10-bit reference image data and/or 12-bit reference image data.

Additionally, the calibration process may include truncating the reference image data to the expected bit-depth of source image data. In other words, continuing with the above example, the (e.g., 10-bit and/or 12-bit) reference image data may be truncated to 8-bit image data, thereby generating a truncated version of the reference image data. Furthermore, the calibration process may include inputting the truncated version of the reference image data into the bit-depth adjustment block and operating the bit-depth adjustment block using a current set of bit adjustment parameters to generate a recovered version of the reference image data, which has a higher bit-depth than the expected bit-depth of source image data.

In some embodiments, the bit-depth adjustment may generate the recovered version of the reference image data such that bit-depth of the recovered version matches bit-depth of an original (e.g., un-truncated) version of the reference image data. For example, when the original version is 10-bit image data, the recovered version of the reference image data may be 10-bit image data. Additionally or alternatively, when the original version is 12-bit image data, the recovered version of the reference image data may be 12-bit image data.

In this manner, performance (e.g., operational efficiency and/or banding removal effectiveness) of the bit-depth adjustment block using the current set of bit-depth adjustment parameters may be evaluated, for example, at least in part by comparing a recovered version of the reference image data with an original version of the reference image data. In fact, in some embodiments, the calibration process may include adaptively adjusting the current value of one or more bit-depth adjustment parameters based at least in part on the performance of the bit-depth adjustment block. For example, the value of one or more bit-depth adjustment parameters may be adjusted when the current set of bit-depth adjustment parameters is expected to result in banding above a perceivability threshold.

Generally, processing image data consumes electrical power and, thus, affects operational efficiency of image processing circuitry. As such, to facilitate improving operational efficiency, in some embodiments, a bit-depth adjustment block may selectively adjust bit-depth of source image data. In other words, in such embodiments, the bit-depth adjustment block may adjust bit-depth of some source image data, but leave bit-depth of other source image data unchanged, which, at least in some instances, may facilitate reducing the amount of processing performed by and, thus, power consumption of the bit-depth adjustment block.

To facilitate selectively performing bit-depth adjustments, in some embodiments, a set of bit-depth adjustment parameters may include one or more detection parameters to be used by the bit-depth adjustment block to detect perceivability of banding and, thus, whether a bit-depth adjust should be performed. For example, the detection parameters may indicate a perceivability threshold and the bit-depth adjust block may decide to perform a bit-depth adjustment when expected banding perceivability is greater than the perceivability threshold, but not when the expected banding perceivability is not greater than the perceivability threshold. In other words, in some embodiments, one or more detection parameters included in a set of bit-depth adjustment parameters may be adjusted to control banding sensitivity, for example, to facilitate striking a target balance between image quality improvement resulting from a bit-depth adjustment and the effect on operational efficiency resulting from performance of the bit-depth adjustment.

In fact, at least in some instances, operational efficiency of a bit-depth adjustment may be affected by the bit-depth of output image data. For example, operational efficiency of expanding 8-bit image data to 10-bit image data may generally be better than operational efficiency of expanding the 8-bit image data to 12-bit image data. As such, to facilitate improving operational efficiency, in some embodiments, a bit-depth adjustment block may selectively vary bit-depth of output image data. In other words, in such embodiments, the bit-depth adjustment block may adjust bit-depth of some source image data to a first (e.g., 10-bit) bit-depth and adjust bit-depth of other source image data to a second (e.g., different or 12-bit) bit-depth.

To facilitate selectively varying bit-depth adjustments, in some embodiments, a set of bit-depth adjustment parameters may include one or more adjustment parameters to be used by the bit-depth adjustment block to adjust bit-depth of source image data, for example, when, based on one or more detection parameters included in a current set of bit-depth adjustment parameters, the bit-depth adjust block determines that a bit-depth adjustment should be performed. As an illustrative example, the adjustment parameters may indicate a target bit-depth of image data to be output from the bit-depth adjustment block. In some embodiments, the target bit-depth may be pre-determined, for example, offline.

Additionally or alternatively, the target bit-depth may be determined at least in part online, for example, during operation of the bit-depth adjustment block and/or its neural network. In particular, in some embodiments, a set of bit-depth adjustment parameters may indicate multiple candidate bit-depths from which the target output bit-depth is selected. For example, the candidate bit-depths may include a 10-bit candidate bit-depth and a 12-bit candidate bit-depth.

Since the operational efficiency of a bit-depth adjustment block is generally dependent on output bit-depth, in some embodiments, the bit-depth adjustment block may attempt to select a lower candidate bit-depth as the target output bit-depth over a higher candidate bit-depth. To facilitate selecting the target output bit-depth, in some embodiments, the bit-depth adjustment block may evaluate performance expected to result from different candidate bit-depths based on detection parameters included in a current set of bit-depth adjustment parameters. For example, the bit-depth adjustment block may select the 10-bit candidate bit-depth as the target bit-depth when 10-bit image data generated by expanding 8-bit source image data is not expected to result in banding greater than a perceivability threshold indicated by the detection parameters. On the other hand, when the 10-bit image data is expected to result in banding greater than the perceivability threshold, the bit-depth adjustment block may select the 12-bit candidate bit depth as the target bit-depth.

To facilitate compatibility with multiple different source formats, in some embodiments, a display pipeline communicatively coupled to an image source may convert source image data into an internal format. In other words, in such embodiments, the display pipeline may convert image data output from the bit-depth adjustment block to the internal format before subsequent processing, for example, to enable the same image processing circuitry to operate on image data received using different source formats. However, in some embodiments, a display panel coupled to the display pipeline may not be directly compatible with the internal format. For example, the display panel may be implemented to operate using unsigned 8-bit image data whereas processed image data in the internal format image data may be signed 30-bit image data.

Thus, when processed image data to be supplied to a display panel is in a format not directly compatible with the display panel, the display pipeline may convert the processed image data into a display format compatible with the display panel. For example, the display pipeline may include a dither block (e.g., image processing circuitry) that operates to convert processed image data into unsigned 8-bit image data. In particular, instead of merely truncating the processed image data, the dither block may add (e.g., introduce) structured noise to the processed image data. As such, even when bit-depth of image data output from an image source matches bit-depth of dithered image data supplied to a display panel, displaying an image based on the dithered image data may nevertheless facilitate reducing likelihood and/or perceivability of visual artifacts occurring in the image, for example, due to the structured noise varying grayscale values of adjacent image pixels in a manner that breaks up banding that would otherwise be perceivable. In this manner, the techniques described in the present disclosure may facilitate improving perceived quality of a displayed image and, thus, potentially an electronic display that is displaying the image with reduced implementation associated cost and/or improved operational efficiency, for example, by enabling bit-depth adjustments to be adaptively (e.g., selectively or intelligently) performed using smaller image pixel windows and, thus, a smaller input buffer.

To help illustrate, an example of an electronic device 10, which utilizes an electronic display 12, is shown in FIG. 1. As will be described in more detail below, the electronic device 10 may be any suitable electronic device, such as a computer, a mobile (e.g., portable) phone, a portable media device, a tablet device, a television, a handheld game platform, a personal data organizer, a virtual-reality headset, a mixed-reality headset, a vehicle dashboard, and/or the like. Thus, it should be noted that FIG. 1 is merely one example of a particular implementation and is intended to illustrate the types of components that may be present in an electronic device 10.

In addition to the electronic display 12, as depicted, the electronic device 10 includes one or more input devices 14, one or more input/output (I/O) ports 16, a processor core complex 18 having one or more processors or processor cores, memory 20, one or more storage devices 22, a network interface 24, a power source 26, and image processing circuitry 27. The various components described in FIG. 1 may include hardware elements (e.g., circuitry), software elements (e.g., a tangible, non-transitory computer-readable medium storing instructions), or a combination of both hardware and software elements. It should be noted that the various depicted components may be combined into fewer components or separated into additional components. For example, the memory 20 and a storage device 22 may be included in a single component. Additionally or alternatively, the image processing circuitry 27 may be included in the processor core complex 18 or the electronic display 12.

As depicted, the processor core complex 18 is operably coupled with memory 20 and the storage device 22. As such, in some embodiments, the processor core complex 18 may execute instructions stored in the memory 20 and/or the storage device 22 to perform operations, such as generating source image data. Additionally or alternatively, the processor core complex 18 may operate based on circuit connections formed therein. As such, in some embodiments, the processor core complex 18 may include one or more general purpose microprocessors, one or more application specific processors (ASICs), one or more field programmable logic arrays (FPGAs), or any combination thereof.

In addition to instructions, in some embodiments, the memory 20 and/or the storage device 22 may store data, such as image data. Thus, in some embodiments, the memory 20 and/or the storage device 22 may include one or more tangible, non-transitory, computer-readable media that store instructions executable by processing circuitry, such as the processor core complex 18 and/or the image processing circuitry 27, and/or data to be processed by the processing circuitry. For example, the memory 20 may include random access memory (RAM) and the storage device 22 may include read only memory (ROM), rewritable non-volatile memory, such as flash memory, hard drives, optical discs, and/or the like.

As depicted, the processor core complex 18 is also operably coupled with the network interface 24. Using the network interface 24, the electronic device 10 may communicate with a communication network and/or another electronic device 10. For example, the network interface 24 may connect the electronic device 10 to a personal area network (PAN), such as a Bluetooth network, a local area network (LAN), such as an 802.11x Wi-Fi network, and/or a wide area network (WAN), such as a 4G or LTE cellular network. In other words, in some embodiments, the network interface 24 may enable the electronic device 10 to transmit data (e.g., image data and/or processing parameters) to a communication network and/or receive data from the communication network.

Additionally, as depicted, the processor core complex 18 is operably coupled to the power source 26. In some embodiments, the power source 26 may provide electrical power to operate the processor core complex 18 and/or other components in the electronic device 10. Thus, the power source 26 may include any suitable source of energy, such as a rechargeable lithium polymer (Li-poly) battery and/or an alternating current (AC) power converter.

Furthermore, as depicted, the processor core complex 18 is operably coupled with one or more I/O ports 16. In some embodiments, the I/O ports 16 may enable the electronic device 10 to interface with another electronic device 10. For example, a portable storage device may be connected to an I/O port 16, thereby enabling the electronic device 10 to communicate data, such as image data, with the portable storage device.

As depicted, the processor core complex 18 is also operably coupled with one or more input devices 14. In some embodiments, an input device 14 may enable a user to interact with the electronic device 10. For example, the input devices 14 may include one or more buttons, one or more keyboards, one or more mice, one or more trackpads, and/or the like. Additionally, in some embodiments, the input devices 14 may include touch sensing components implemented in the electronic display 12. In such embodiments, the touch sensing components may receive user inputs by detecting occurrence and/or position of an object contacting the display surface of the electronic display 12.

In addition to enabling user inputs, the electronic display 12 may facilitate providing visual representations of information by displaying one or more images (e.g., image frames or pictures). For example, the electronic display 12 may display a graphical user interface (GUI) of an operating system, an application interface, text, a still image, or video content. To facilitate displaying images, the electronic display 12 may include a display panel with one or more display pixels. Additionally, in some embodiments, each display pixel may include one or more sub-pixels, which each control luminance of one color component (e.g., red, blue, or green).

As described above, the electronic display 12 may display an image by controlling luminance of its display pixels based at least in part on image data associated with corresponding image pixels (e.g., points) in the image. In some embodiments, image data may be generated by an image source, such as the processor core complex 18, a graphics processing unit (GPU), and/or an image sensor. Additionally, in some embodiments, image data may be received from another electronic device 10, for example, via the network interface 24 and/or an I/O port 16. In any case, as described above, the electronic device 10 may be any suitable electronic device.

Figure 2:
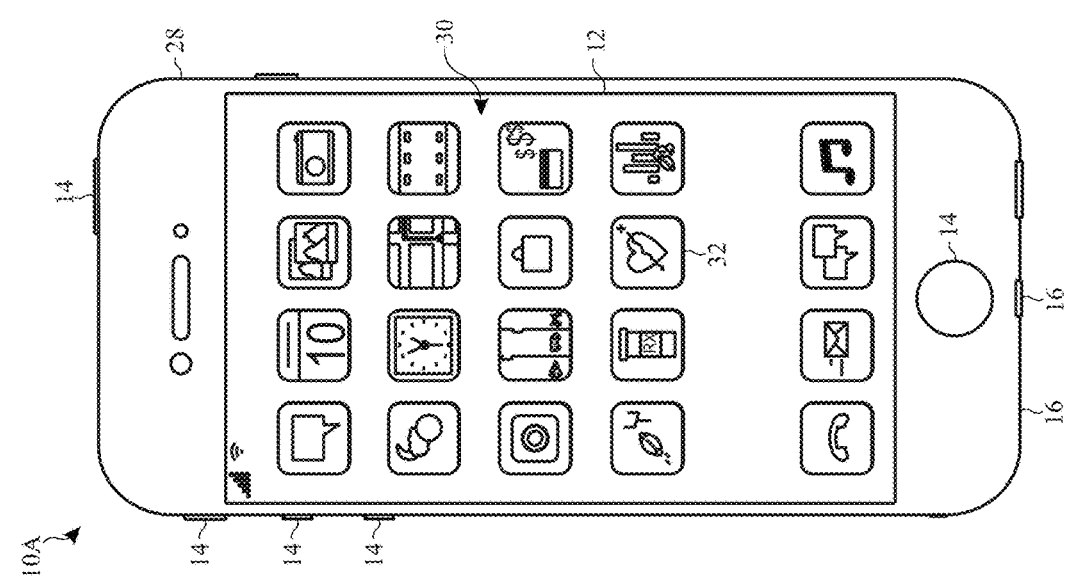
FIG. 2 is an example of the electronic device of FIG. 1, in accordance with an embodiment of the present disclosure

To help illustrate, one example of a suitable electronic device 10, specifically a handheld device 10A, is shown in FIG. 2. In some embodiments, the handheld device 10A may be a portable phone, a media player, a personal data organizer, a handheld game platform, and/or the like. For example, the handheld device 10A may be a smart phone, such as any iPhone® model available from Apple Inc.

As depicted, the handheld device 10A includes an enclosure 28 (e.g., housing). In some embodiments, the enclosure 28 may protect interior components from physical damage and/or shield them from electromagnetic interference. Additionally, as depicted, the enclosure 28 surrounds the electronic display 12. In the depicted embodiment, the electronic display 12 is displaying a graphical user interface (GUI) 30 having an array of icons 32. By way of example, when an icon 32 is selected either by an input device 14 or a touch-sensing component of the electronic display 12, an application program may launch.

Furthermore, as depicted, input devices 14 open through the enclosure 28. As described above, the input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voice-recognition feature, provide volume control, and/or toggle between vibrate and ring modes. As depicted, the I/O ports 16 also open through the enclosure 28. In some embodiments, the I/O ports 16 may include, for example, an audio jack to connect to external devices.

Figure 3:
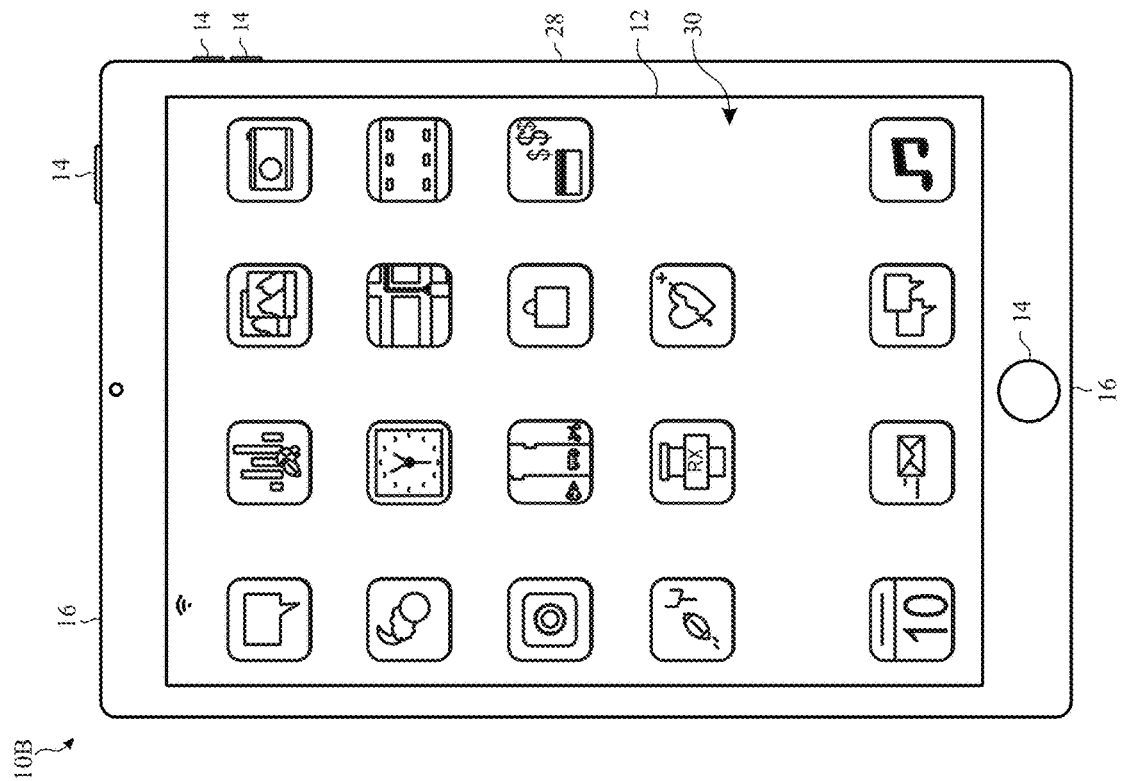
FIG. 3 is another example of the electronic device of FIG. 1, in accordance with an embodiment of the present disclosure.
Figure 4:
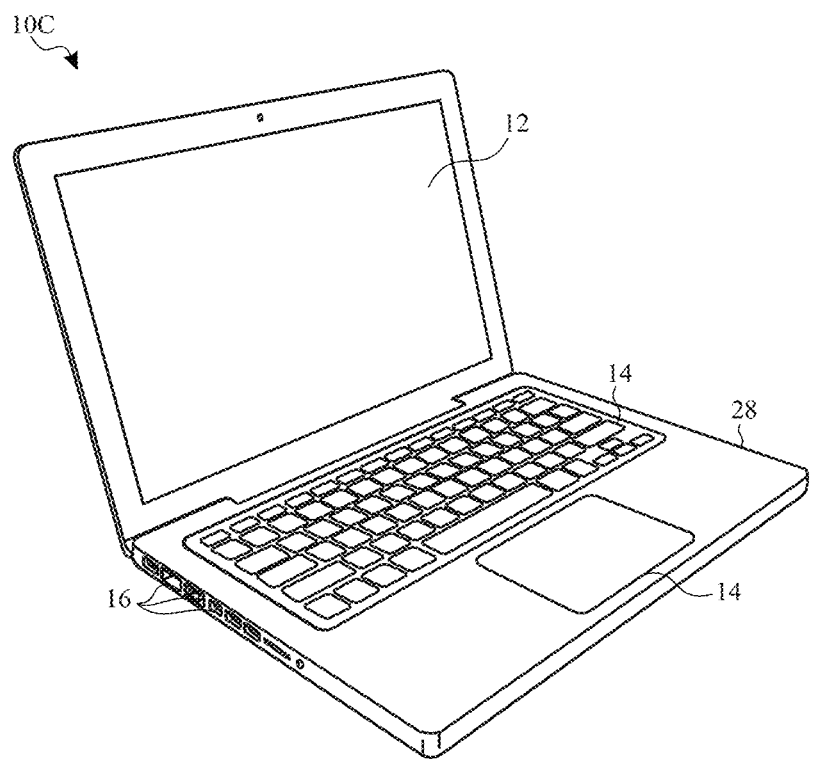
FIG. 4 is another example of the electronic device of FIG. 1, in accordance with an embodiment of the present disclosure.
Figure 5:
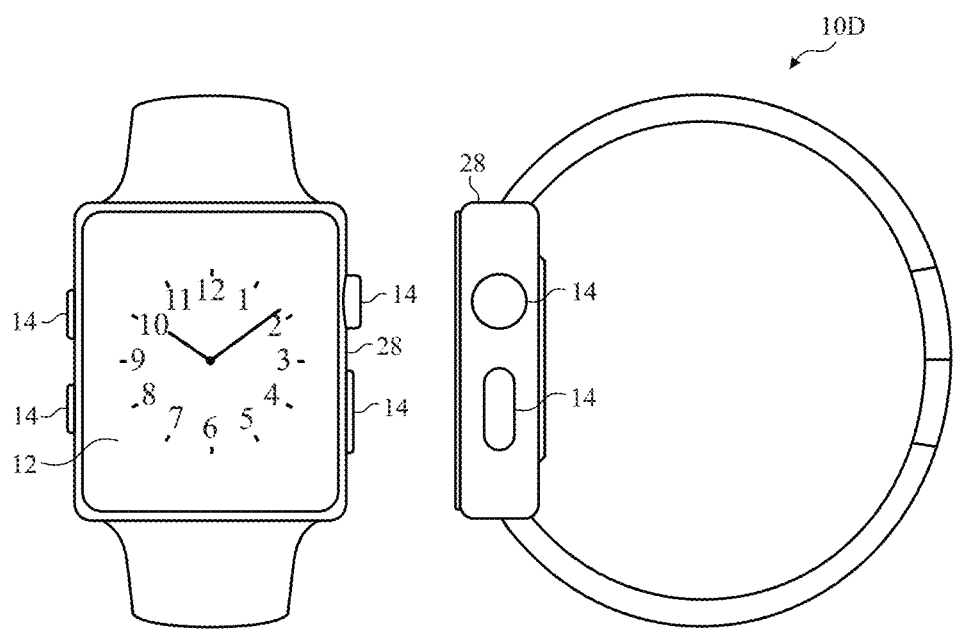
FIG. 5 is another example of the electronic device of FIG. 1, in accordance with an embodiment of the present disclosure.

To further illustrate, another example of a suitable electronic device 10, specifically a tablet device 10B, is shown in FIG. 3. For illustrative purposes, the tablet device 10B may be any iPad® model available from Apple Inc. A further example of a suitable electronic device 10, specifically a computer 10C, is shown in FIG. 4. For illustrative purposes, the computer 10C may be any MacBook® or iMac® model available from Apple Inc. Another example of a suitable electronic device 10, specifically a watch 10D, is shown in FIG. 5. For illustrative purposes, the watch 10D may be any Apple Watch® model available from Apple Inc. As depicted, the tablet device 10B, the computer 10C, and the watch 10D each also includes an electronic display 12, input devices 14, I/O ports 16, and an enclosure 28.

As described above, an electronic display 12 may display images based at least in part on image data, for example, received from the processor core complex 18 and/or the image processing circuitry 27. To facilitate improving perceived quality of a displayed image and, thus, potentially an electronic display 12 that is displaying the image, as described above, image data output from an image source may be processed before the image data is used to display a corresponding image on the electronic display 12. In other words, to facilitate improving perceived image quality, in some embodiments, image processing circuitry 27 may be implemented between the image source and a display panel of the electronic display 12, for example, in a display pipeline.

Figure 6:
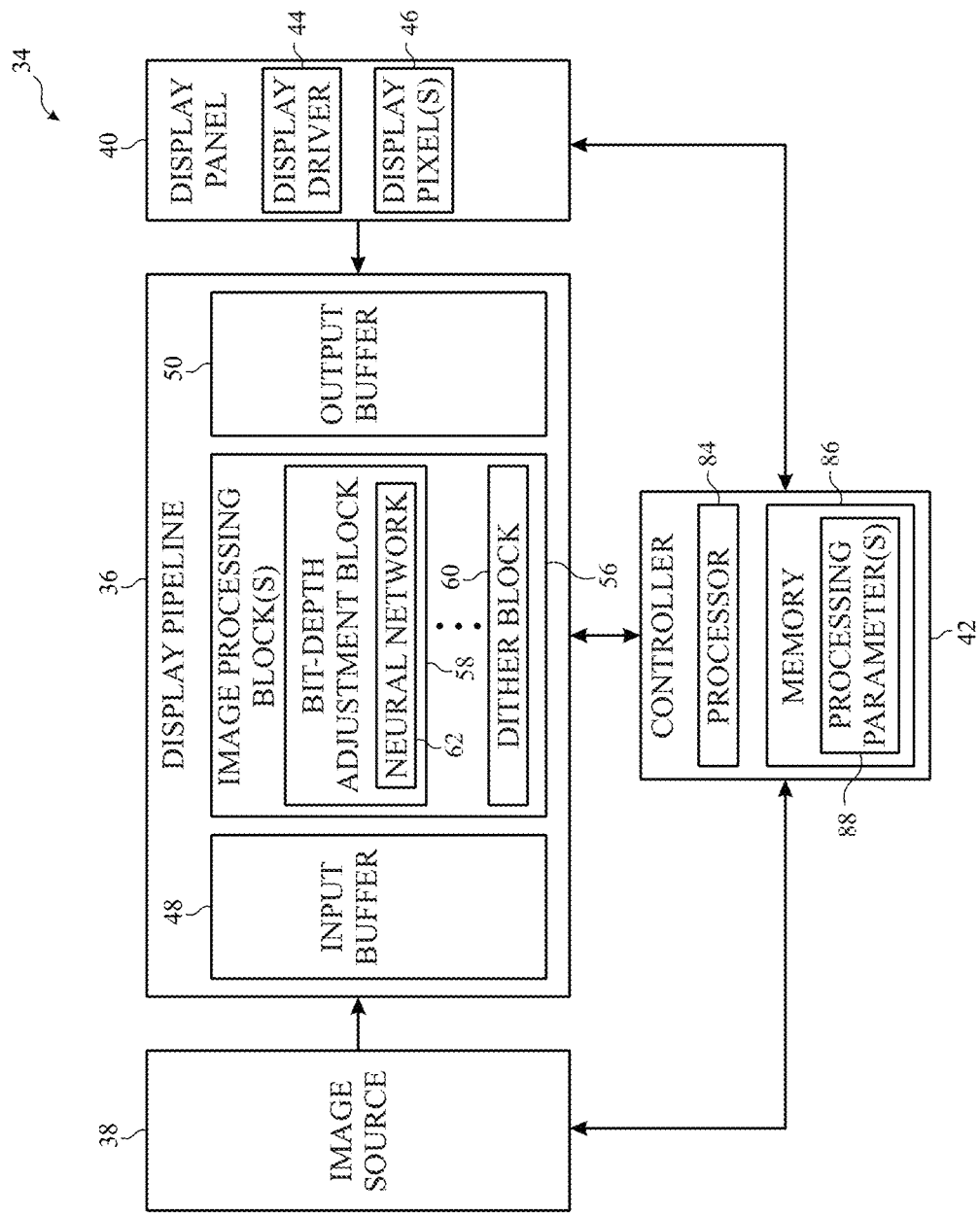
FIG. 6 is a block diagram an example portion of the electronic device of FIG. 1 including a display pipeline, in accordance with an embodiment of the present disclosure.

To help illustrate, an example of a portion 34 of an electronic device 10 including a display pipeline 36 is shown in FIG. 6. In some embodiments, the display pipeline 36 may be implemented by circuitry in the electronic device 10, circuitry in an electronic display 12, or a combination thereof. For example, the display pipeline 36 may be included in the processor core complex 18, the image processing circuitry 27, a timing controller (TCON) in the electronic display 12, or any combination thereof. Additionally or alternatively, the display pipeline 36 may be implemented as a system-on-chip (SoC).

In addition to the display pipeline 36, as depicted, the portion 34 of the electronic device 10 includes an image source 38, a display panel 40 of the electronic display 12, and a controller 42. As described above, an image source 38 generally operates to generate source image data in a source format. For example, the image source 38 may generate 8-bit fixed point αRGB image data, 10-bit fixed point αRGB image data, signed 16-bit floating point αRGB image data, 8-bit fixed point YCbCr image data, 10-bit fixed point YCbCr image data, 12-bit fixed point YCbCr image data, or any combination thereof. Thus, in some embodiments, the image source 38 may be a processor core complex 18, a graphics processing unit (GPU), an image sensor (e.g., camera), and/or the like.

Additionally, as in the depicted example, the display pipeline 36 may be communicatively coupled between the image source 38 and the display panel 40. As such, the display pipeline 36 may receive source image data output from the image source 38. In some embodiments, the display pipeline 36 may receive source image data directly from the image source 38. Additionally or alternatively, the image source 38 may indirectly communicate source image data to the display pipeline 36. For example, the image source 38 may store source image data in memory 20 and the display pipeline 36 may retrieve the source image data from the memory 20 (e.g., via direct memory access (DMA)).

Furthermore, as described above, a display panel 40 generally operates to display images based on received image data. In other words, the display panel 40 may operate to display an image based on corresponding image data received from the display pipeline 36. For example, the display panel 40 may display an image based on 8-bit fixed point αRGB image data and/or 10-bit fixed point αRGB format output from the display pipeline 36.

To display facilitate displaying images, as in the depicted example, the display panel 40 may include a display driver 44 and one or more display pixels 46. As described above, image data corresponding with an image may indicate target grayscale (e.g., luminance or brightness) values of one or more image pixels (e.g., points) in the image. Accordingly, to display an image, the display driver 44 may selectively supply analog electrical (e.g., voltage and/or current) signals to the display pixels 46 to control light emission and, thus, perceived luminance of the display pixels 46 based on corresponding target grayscale values indicated in image data received from the display pipeline 36.

To facilitate improving perceived image quality, as described above, the display pipeline 36 may process image data before supply to the display panel 40. In other words, the display pipeline 36 may include image processing circuitry 27 that processes source image data received from the image source 38 to determine processed image data, which is then supplied to the display panel 40 to display a corresponding image. To simplify discussion, processing operations (e.g., functions) performed by image processing circuitry 27 in the display pipeline 36 is divided between various image processing blocks 56 (e.g., circuitry groups, units, or modules).

In other words, as in the depicted example, image processing circuitry 27 implemented in a display pipeline 36 may be organized (e.g., arranged or grouped) into one or more image processing blocks 56. For example, the image processing blocks 56 may include a bit-depth adjustment block 58 and a dither block 60. In some embodiments, the image processing blocks 56 may additionally or alternatively include an internal format conversion block, a color manager block, an ambient adaptive pixel (AAP) block, a dynamic pixel backlight (DPB) block, a white point correction (WPC) block, a sub-pixel layout compensation (SPLC) block, a burn-in compensation (BIC) block, a panel response correction (PRC) block, a dithering block, a sub-pixel uniformity compensation (SPUC) block, a content frame dependent duration (CDFD) block, an ambient light sensing (ALS) block, or any combination thereof.

In some embodiments, image processing blocks 56 may successively process image data corresponding with different image pixels (e.g., points) in an image and, thus, display pixels 46 on the display panel 40 to be used to display the image. To facilitate relaxing timing constraints on operation of its image processing blocks 56, as in the depicted example, the display pipeline 36 may include an input buffer 48 and/or an output buffer 50. Generally, the input buffer 48 may be operated to store image data to be processed by image processing circuitry 27 implemented in the display pipeline 36. On the other hand, the output buffer 50 may generally be operated to store image data output from image processing circuitry 27 implemented in the display pipeline 36, for example, before the image data is supplied to the display panel 40.

In other words, the display pipeline 36 may store source image data to be processed by one or more of its image processing blocks 56 in its input buffer 48. In this manner, one or more image processing blocks 56 implemented in the display pipeline 36 may process source image data retrieved from the input buffer 48 to determine processed image data expected to improve perceived image quality compared to the source image data. In particular, in some embodiments, the bit-depth adjustment block 58 may retrieve source image data from the input buffer 48 and process the source image data to facilitate reducing likelihood and/or perceivability of banding occurring in a corresponding image before further processing by one or more downstream (e.g., subsequent) image processing blocks 56, such as an internal format conversion block that operates to convert image data output from the bit-depth adjustment block 58 into an internal image data format and/or a dither block 60 that operates to convert processed image data into an image data format compatible with the display panel 40 before storage in the output buffer 50.

As described above, perceivable banding that affects (e.g., reduces) perceived quality of a displayed image often occurs in portions of the image that include gradient image content, such as a blue sky. Additionally, as described above, perceivable visual artifacts, such as banding, may occur in a displayed image when the image is displayed directly using source image data, for example, due to the number of grayscale values indicatable by the fixed bit-depth of the source image data resulting in source image data corresponding with adjacent image pixels, which have different grayscale values in the actual gradient image content, indicating the same grayscale value. As such, to facilitate reducing likelihood and/or perceivability of banding occurring at a display pixel 46, the bit-depth adjustment block 58 may process source image data of a corresponding image pixel based at least in part on source image data corresponding with a window (e.g., block or group) of image pixels including the corresponding image pixel.

In other words, the bit-depth adjustment block 58 may process source image data corresponding with an image pixel currently being processed based at least in part on analysis of source image data corresponding with an image pixel window including the current image pixel. For example, the bit-depth adjustment block 58 may analyze the image pixel window to determine gradient in the image pixel window and, thus, likelihood and/or perceivability of banding occurring at a display pixel 46 corresponding with the current image pixel. As such, in some embodiments, an image pixel window may be a moving window that includes one or more image pixels to be processed before the current image pixel and/or one or more image pixels to be processed after the current image pixel.

To facilitate analyzing an image pixel window, in some embodiments, corresponding source image data may be stored in the input buffer 48. In other words, in such embodiments, the input buffer 48 may be operated to retain storage of source image data corresponding with one or more image pixels even after image processing circuitry 27 in the display pipeline 36 has started or even completed processing of the source image data. Accordingly, the input buffer 48 may be sized to provide sufficient storage capacity for storing image data corresponding with an image pixel window.

However, at least in some instances, storage capacity of an input buffer 48 may affect implementation associated cost of the display pipeline 36 and, thus, an electronic device 10 in which the display pipeline 36 is deployed. For example, physical size (e.g., footprint) of the input buffer may be increased to accommodate a larger storage capacity, which, at least in some instances, may reduce space (e.g., real estate) available for implementing image processing circuitry 27 in the display pipeline 36 and/or increase physical size of the display pipeline 36. On the other hand, decreasing storage capacity may enable physical size of the input buffer 48 to be reduced, which, at least in some instances, may increase space available for implementing image processing circuitry 27 in the display pipeline 36 and/or enable physical size of the display pipeline 36 to be reduced.

To facilitate reducing implementation associated cost, in some embodiments, the bit-depth adjustment block 58 may utilize machine learning techniques to enable source image data to be processed using smaller image pixel windows, for example, compared to image pixel windows used in traditional gradient calculation and banding removal techniques. In other words, implementing machine learning techniques in the bit-depth adjustment block 58 may enable size of analyzed image pixel windows and, thus, storage capacity of the input buffer 48 to be reduced. To implement machine learning techniques, in some embodiments, the bit-depth adjustment block 58 may utilize a neural network 62, such as a convolutional neural network.

Figure 7:
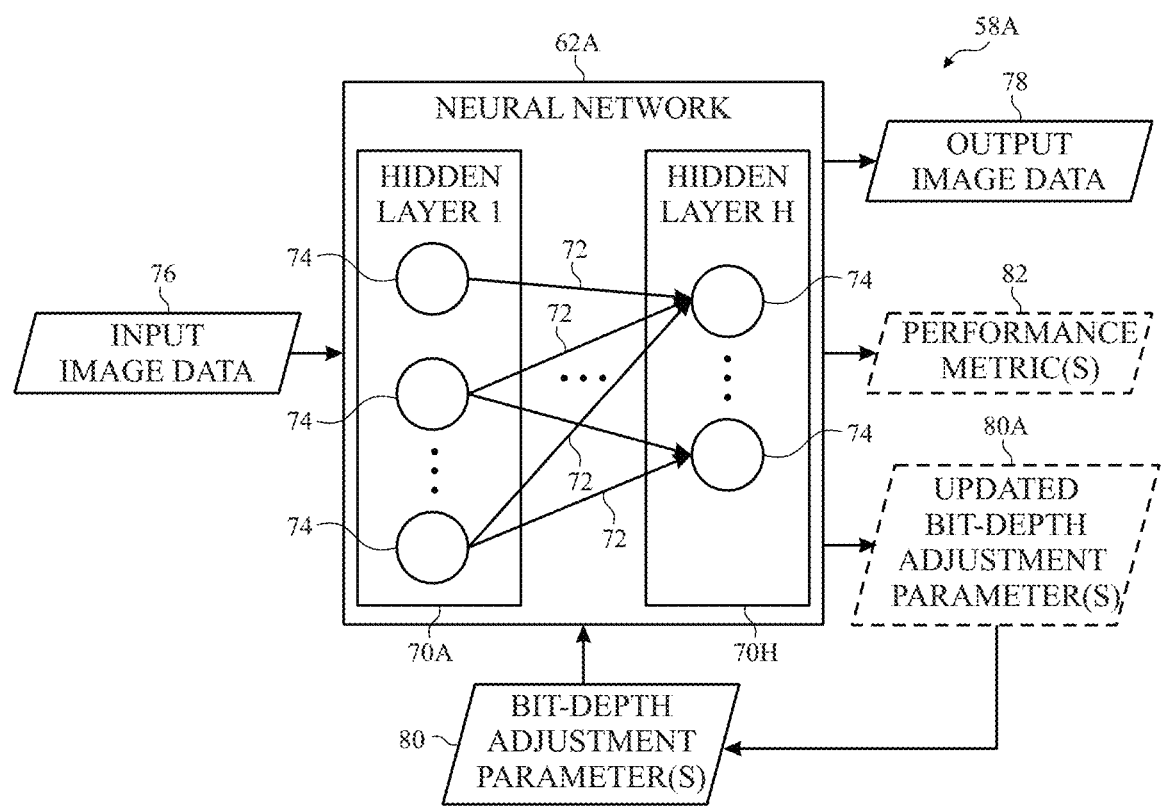
FIG. 7 is a block diagram of an example of a bit-depth adjustment block included in the display pipeline of FIG. 6, in accordance with an embodiment of the present disclosure.

To help illustrate, an example of a bit-depth adjustment block 58A, which includes a neural network 62A, is shown in FIG. 7. As in the depicted example, a neural network 62A may include one or more hidden (e.g., convolution) layers 70 connected via one or more layer interconnections 72. Additionally, as in the depicted example, a hidden layer 70 may include one or more nodes 74.

However, it should be appreciated that the depicted neural network 62A is merely intended to be illustrative and not limiting. For example, in some embodiments, a neural network 62A utilized by a bit-depth adjustment block 58A may include one or more additional layers, such as one or more pooling layers (not depicted). Additionally or alternatively, the neural network 62A utilized by the bit-depth adjustment block 58A may include a single hidden layer 70 or more than two hidden layers 70.

As described above, in some embodiments, a bit-depth adjustment block 58 may process source image data to facilitate reducing likelihood and/or perceivability of banding occurring in a corresponding image, for example, by determining whether banding above a perceivability threshold is expected to occur at a display pixel 46 based on analysis of an image pixel window including a corresponding image pixel and adjusting (e.g., expanding or increasing) bit-depth of corresponding source image data when banding above the perceivability threshold is expected to occur. In other words, the neural network 62A utilized by the bit-depth adjustment block 58A may process input image data 76, such as source image data corresponding with an image pixel window, to facilitate determining expected characteristics of a corresponding image, such a location and/or perceivability of banding expected to result in the image if displayed directly using the source image data. Additionally, based at least in part on the expected characteristics, the neural network 62A may generate output image data 78 corresponding with the image, for example, which has a different (e.g., higher) bit-depth compared to the input image data 76 when the input image data 76 is expected to result in banding above a perceivability threshold.

To facilitate processing the input image data 76 and/or generating the output image data 78, nodes 74 in the neural network 62A may apply weights to inputs thereto. In some embodiments, a node 74 may apply one or more weights to image data input thereto to determine one or more feature metrics, for example, indicative of likelihood that specific characteristics (e.g., features) are present in the corresponding image. For example, nodes 74 in a first hidden layer 70A may apply weights to the input image data 76 (e.g., source image data corresponding with an image pixel window) to determine a first feature metric indicative of whether the input image data 76 includes a band of uniform grayscale values.

In some embodiments, the neural network 62A may include multiple successive hidden layers 70 to facilitate determining characteristics of an image with varying degrees of abstraction. In other words, in such embodiments, a feature metric determined in a hidden layer 70 of the neural network 62A may be output to another hidden layer 70 to enable the other hidden layer 70 to leverage the received feature metric in determining another feature metric with a different level of abstraction. For example, the first hidden layer 70A may output the first feature metric, which is indicative of whether the input image data 76 includes a band of uniform grayscale values, to a downstream (e.g., subsequent) hidden layer 70. In this manner, one or more nodes 74 in the downstream hidden layer may apply weights to image data (e.g., input image data 76 and/or image data output from an upstream hidden layer 70) input thereto based on the first feature metric, for example, to determine a second feature metric indicative of expected perceivability of the band of uniform grayscale values.

In addition to facilitating determination of feature metrics, in some embodiments, a node 74 may apply one or more weights to image data input thereto to adjust (e.g., change) the image data. For example, an Hth hidden layer 70H may receive the second feature metric, which is indicative of expected banding perceivability, from an upstream (e.g., previous) hidden layer 70. Based on the second feature metric, one or more nodes 74 in the Hth hidden layer 70H may apply weights to image data (e.g., input image data 76 and/or image data output from an upstream hidden layer 70) input thereto to generate the output image data 78. For example, when expected banding perceivability indicated by the second feature metric is greater than a perceivability threshold, the Hth hidden layer 70H may generate the output image data 78 with an expanded bit-depth compared to the input image data 76 (e.g., source image data) to facilitate reducing likelihood and/or perceivability of the banding in a corresponding image.

In some embodiments, operation of image processing blocks 56, such as the bit-depth adjustment block 58, may be controlled (e.g., adaptively adjusted) based at least in part on corresponding processing parameters. For example, operation of the bit-depth adjust block 58A and, thus, the neural network 62A utilized by the bit-depth adjustment block 58A may be controlled based at least in part on bit-depth adjustment parameters 80. In some embodiments, bit-depth adjustment parameters 80 may be indicated using varying levels of specificity.

For example, a set of bit-depth adjustment parameters 80 may be indicated at least in part using block level specificity. As an illustrative example, a set of bit-depth adjustment parameters 80 may include one or more detection parameters, such as a target perceivability threshold, a target banding sensitivity, and/or a target image pixel window size, to be used by the bit-depth adjustment block 58 to detect expected banding perceivability. The set of bit-depth adjustment parameters 80 may additionally include one or more adjustment parameters, such as a target output bit-depth, to be used by the bit-depth adjustment block 58 to generate output image data 78 with an adjusted bit-depth compared to the input image data 76, for example, when, based on one or more detection parameters included in the set of bit-depth adjustment parameters 80, the bit-depth adjust block 58A determines that expected banding perceivability is greater than the target perceivability threshold.

Additionally or alternatively, a set of bit-depth adjustment parameters 80 may be indicated at least in part using neural network level specificity. For example, the set of bit-depth adjustment parameters 80 may indicate a number of hidden layers 70 to implement in the neural network 62A, number of nodes 74 to implement in each hidden layer 70, one or more weights to be applied by each node 74, and/or configuration (e.g., number and/or interconnected nodes 74) of layer interconnections 72. In fact, in some embodiments, bit-depth adjustment parameters 80 indicated using the neural network level specificity may be determined in a manner that implements one or more bit-depth adjustment parameters 80 indicated using the block level specificity.

To facilitate improving performance (e.g., operational efficiency and/or banding removal effectiveness) of a bit-depth adjustment block 58, in some embodiments, the value of one or more bit-depth adjustment parameters 80 may be updated (e.g., calibrated or adjusted). As will be described in more detail below, in some embodiments, the value of one or more bit-depth adjustment parameters 80 may be calibrated (e.g., tuned or trained) based at least in part on performance of the bit-depth adjustment block 58 using a current set of bit-depth adjustment parameters 80, for example, during a calibration (e.g., training or tuning) process performed offline before deployment and/or periodically after deployment. Additionally or alternatively, the value of one or more bit-depth adjustment parameters 80 may be updated online, for example, during operation of the bit-depth adjustment block 58A and/or the neural network 62A.

In fact, in some embodiments, the neural network 62A may determine one or more updated bit-depth adjustment parameters 80A. For example, an updated bit-depth adjustment parameter 80A may include a target output bit-depth selected from multiple candidate bit-depths indicated in a current set of bit-depth adjustment parameters 80 based at least in part on performance expected to result from selecting different candidate bit-depths as the target output bit-depth. To facilitate evaluating performance, in some embodiments, the neural network 62A may additionally or alternatively determine one or more performance metrics 82.

In some embodiments, the performance metrics 82 may be indicative of operational efficiency of the neural network 62A and, thus, the bit-depth adjustment block 58A. For example, one or more performance metrics 82 may indicate processing duration and/or power consumption resulting from operation of the bit-depth adjustment block 58A using the current set of bit-depth adjustment parameters 80. Additionally or alternatively, the performance metrics 82 may be indicative of banding removal effectiveness of the neural network 62A and, thus, the bit-depth adjustment block 58A. For example, one or more performance metrics 82 may indicate likelihood and/or perceivability of banding resulting from operating the bit-depth adjustment block 58A using the current set of bit-depth adjustment parameters 80. In other words, in some embodiments, the performance metrics 82 may include one or more feature metrics determined by the neural network 62A. In this manner, a bit-depth adjustment block 58 may be implemented to adaptively adjust bit-depth of source (e.g., input) image data using machine learning techniques, such as a neural network 62.

Returning to the display pipeline 36 of FIG. 6, as described above, one or more other image processing blocks 56 may be coupled downstream relative to the bit-depth adjustment block 58. For example, an internal format conversion block (e.g., image processing block 56) may be implemented in the display pipeline 36 downstream relative to the bit-depth adjustment block 58. In some embodiments, the internal format conversion block may operate to convert image data output from the bit-depth adjustment block 58 into an internal format, such as a signed 30-bit image data format, before further processing by one or more downstream image processing block 56, such as the dither block 60, in the display pipeline 36. At least in some instances, converting image data into the internal format may facilitate improving operational flexibility of downstream image processing blocks 56, for example, by enabling the same image processing circuitry 27 to be used to process image data received using different source formats.

Additionally, in some embodiments, the dither block 60 may be implemented in the display pipeline 36 downstream relative to one or more other image processing blocks 56, such as the bit-depth adjustment block 58 and/or the internal format conversion block. In other words, the dither block 60 may receive processed image data output from one or more upstream (e.g., previous) image processing blocks 56, for example, using the internal format. However, at least in some instances, the format of processed image data received by the dither block 60 may not be directly compatible with a display panel 40 coupled to the display pipeline 36.

Accordingly, at least in such instances, the dither block 60 may operate to convert received processed image data into a display format compatible with the display panel 40, for example, before storage in the output buffer 50. In particular, in some embodiments, the dither block 60 may convert processed image data (e.g., from the internal format used by an upstream image process block 56) into the display format at least in part by adding structured noise to the processed image data. For example, the dither block 60 may add structured noise to the processed image data to facilitate converting the processed image data from a signed 30-bit image data format to an unsigned 8-bit image data format, such as an 8-bit fixed point αRGB image data format, compatible with the display panel 40.

In some embodiments, the controller 42 may generally control operation of the display pipeline 36 and, thus, one or more image processing blocks 56 implemented in the display pipeline 36, for example, in addition to operation of the image source 38 and/or operation of the display panel 40. Although depicted as a single controller 42, in other embodiments, one or more separate controllers 42 may be used to control operation of the display pipeline, the image source 38, and/or the display panel 40. To facilitate controlling operation, the controller 42 may include at least one controller processor 84 and/or controller memory 86.

In some embodiments, the controller processor 84 may include processing circuitry that executes instructions and/or processes data stored in the controller memory 86 to determine one or more control commands, for example, which instructs the display pipeline 36 to perform a control action, such as retrieving source image data from memory 20. Additionally or alternatively, the controller processor 84 may be hardwired with instructions that determine control commands when executed. Furthermore, in some embodiments, the controller processor 84 may be included in the processor core complex 18 and/or separate processing circuitry.

Additionally, in some embodiments, the controller memory 86 may be included in memory 20, a storage device 22, and/or another tangible, non-transitory computer-readable medium. Furthermore, as in the depicted example, the controller memory 86 may store one or more processing parameters 88 to be implemented by image processing circuitry 27 in the display pipeline 36. For example, the processing parameters 88 may include one or more bit-depth adjustment parameters 80 to be implemented by the bit-depth adjustment block 58. Additionally or alternatively, the processing parameters 88 may include one or more dither parameters to be implemented by the dither block 60, for example, which indicates a target bit-depth and/or a target image data format compatible with the display panel 40. In this manner, a display pipeline 36 may be implemented to process image data before the image data is used by a display panel 40 of an electronic display 10 to display a corresponding image, for example, to facilitate improving perceived quality of the displayed image and, thus, the electronic display 10.

Figure 8:
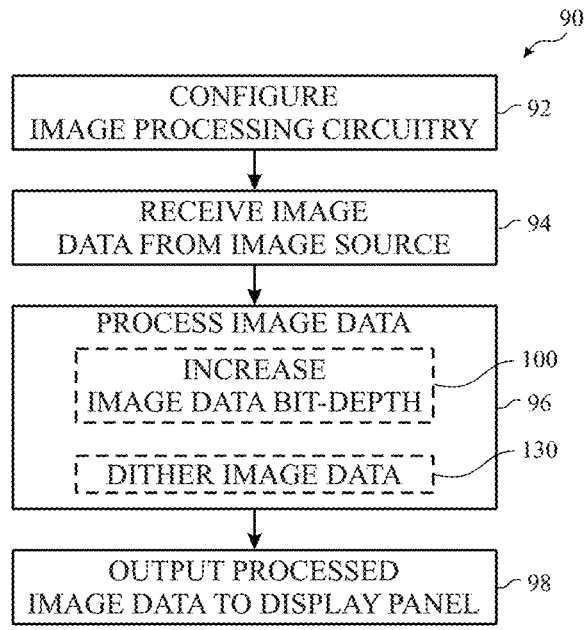
FIG. 8 is a flow diagram of an example process for operating the display pipeline of FIG. 6, in accordance with an embodiment of the present disclosure.

To help illustrate, an example of a process 90 for operating a display pipeline 36 is described in FIG. 8. Generally, the process 90 includes configuring image processing circuitry (process block 92) and receiving image data from an image source (process block 94). Additionally, the process 90 includes processing the image data (process block 96) and outputting processed image data to a display panel (process block 98).

Although described in a particular order, which represents a particular embodiment, it should be noted that the process 90 may be performed in any suitable order. Additionally, embodiments of the process 90 may omit process blocks and/or include additional process blocks. Moreover, in some embodiments, the process 90 may be implemented at least in part by executing instructions stored in a tangible, non-transitory, computer-readable medium, such as controller memory 86, using processing circuitry, such as the controller processor 84.

Accordingly, in some embodiments, a controller 42 may instruct a display pipeline 36 to configure (e.g., program) its image processing circuitry 27 (process block 92). As described above, in some embodiments, operation of one or more image processing blocks 56 (e.g., image processing circuitry 27) may be controlled based at least in part on corresponding processing parameters 88. In other words, in such embodiments, the display pipeline 36 may configure operation of its bit-depth adjustment block 58 based at least in part on a set of bit-depth adjustment parameters 80 included in the processing parameters 88.

Additionally, as described above, in some embodiments, processing parameters 88 to be used to configure operation of image processing circuitry 27 may be stored in a tangible, non-transitory, computer-readable medium, such as controller memory 86. Thus, in such embodiments, the display pipeline 36 may retrieve one or more processing parameters 88 from the tangible, non-transitory, computer-readable medium and program (e.g., configure) one or more corresponding image processing blocks 56 accordingly. Furthermore, in some embodiments, operation of an image processing block 56 may be programmed at least in part by storing processing parameters 88 in one or more corresponding registers implemented in the image processing block 56. For example, the display pipeline may program the bit-depth adjustment block 58 at least in part by storing the set of bit-depth adjustment parameters 80 in one or more registers implemented in the bit-depth adjustment block 58.

Additionally, the display pipeline 36 may receive source image data generated and/or output by an image source 38, such as a processor core complex 18, a graphics processing unit (GPU), an image sensor (e.g., camera), and/or the like (process block 94). As described above, in some embodiments, the image source 38 may store source image data in a tangible, non-transitory, computer-readable medium, such as memory 20, communicatively coupled between the image source 38 and the display pipeline 36, for example, instead of directly outputting the source image data to the display pipeline 36. Accordingly, in such embodiments, the display pipeline 36 may retrieve the source image data from the tangible, non-transitory, computer-readable medium, for example, via direct memory access (DMA). Furthermore, as described above, the display pipeline 36 may store received source image data in an input buffer 48 coupled to one or more of its image processing blocks 56.

As such, one or more image processing blocks 56 in the display pipeline may retrieve source image data from the input buffer 48 and/or process the source image data to generate processed image data (process block 96). As described above, in some embodiments, image processing circuitry 27 implemented in a display pipeline 36 may successively process image data corresponding with different image pixels in an image and, thus, different display pixels 46 on a display panel 40 to be used to display the image. For example, the bit-depth adjustment block 58 may initiate processing of a current image pixel by retrieving source image data corresponding with an image pixel window, which includes the current image pixel, from the input buffer 48 and processing the source image based on a current set of bit-depth adjustment parameters 80. In particular, in some embodiments, the bit-depth adjustment block 58 may increase (e.g., expand) bit-depth of source image data corresponding with the current image pixel, for example, when processing of the image pixel window is indicative that banding above a perceivability threshold is expected at the corresponding display pixel 46 (process block 100).

Figure 9:
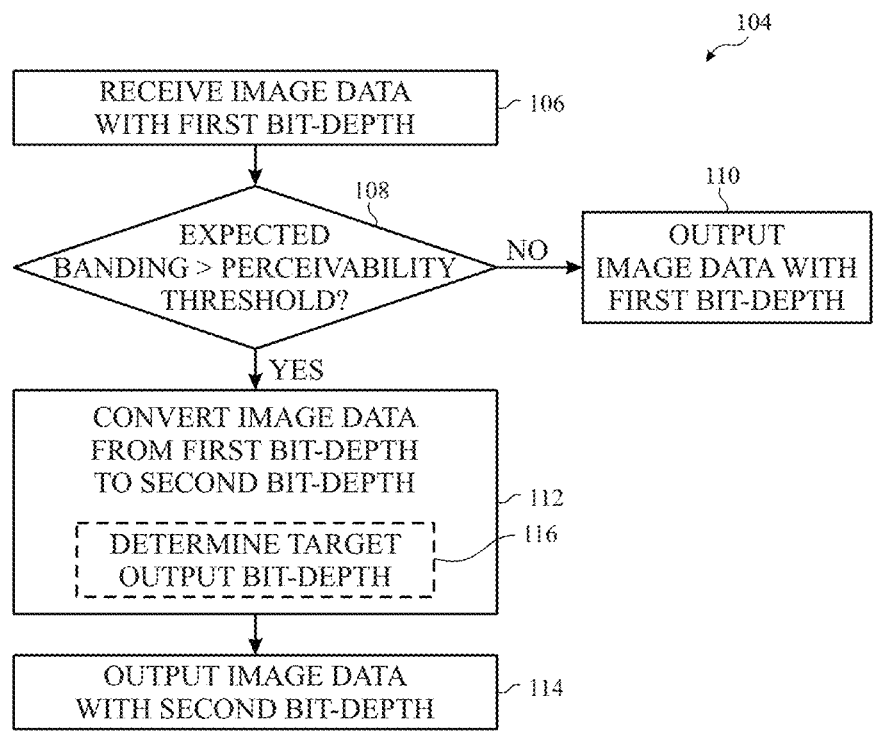
FIG. 9 is a flow diagram of an example process for operating the bit-depth adjustment block of FIG. 7, in accordance with an embodiment of the present disclosure.

To help illustrate, an example of a process 104 for operating a bit-depth adjustment block 58, which may be included in image processing circuitry 27 of a display pipeline 36, is described in FIG. 9. Generally, the process 104 includes receiving image data with a first bit-depth (process block 106), determining whether expected banding is greater than a perceivability threshold (decision block 108), and outputting image data with the first bit-depth when the expected banding is not greater than the perceivability threshold (process block 110). Additionally, when the expected banding is greater than the perceivability threshold, the process 104 includes converting the image data from the first bit-depth to a second bit-depth (process block 112) and outputting the image data with the second bit-depth (process block 114).

Although described in a particular order, which represents a particular embodiment, it should be noted that the process 104 may be performed in any suitable order. Additionally, embodiments of the process 104 may omit process blocks and/or include additional process blocks. Moreover, in some embodiments, the process 104 may be implemented at least in part by executing instructions stored in a tangible, non-transitory, computer-readable medium, such as controller memory 86, using processing circuitry, such as the controller processor 84.

Accordingly, in some embodiments, a controller 42 may instruct a bit-depth adjustment block 58 (e.g., image processing circuitry 27) to retrieve image data with a first bit-depth from an input buffer 48 (process block 106). As described above, in some embodiments, an input buffer 48 may be operated to store source image data. In other words, in such embodiments, the bit-depth adjustment block 58 may retrieve source image data from the input buffer 48. For example, the bit-depth adjustment block 58 may retrieve 8-bit αRGB source image data from the input buffer 48.

Additionally, as described above, in some embodiments, image processing blocks 56, such as the bit-depth adjustment block 58, may successively process image pixels in an image. In other words, in such embodiments, the bit-depth adjustment block 58 may successively process source image data corresponding with different image pixels to facilitate reducing likelihood and/or perceivability of banding resulting at corresponding display pixels 46. However, as described above, banding visual artifacts often occur in gradient image content and, thus, across multiple image pixels.

As such, to facilitate appropriately processing source image data corresponding with a current image pixel, the bit-depth adjustment block 58 may retrieve source image data corresponding with a window (e.g., group or block) of image pixels including the current image pixel. In other words, the bit-depth adjustment block 58 may retrieve source image data corresponding with the current image pixel as well as source image data corresponding with one or more other image pixels from the input buffer 48. In this manner, the bit-depth adjustment block 58 may adaptively adjust processing of the source image data corresponding with the current image pixel based at least in part on analysis of the image pixel window as a whole.

In particular, the bit-depth adjustment block 58 may determine expected perceivability of banding, which potentially results at the current image pixel, and whether the expected banding perceivability is greater than a perceivability threshold (decision block 108). For example, using traditional banding removal techniques, the bit-depth adjustment block 58 may determine gradient across the image pixel window and determine expected banding perceivability at the current image pixel based at least in part on the gradient. However, as described above, size of the image pixel window may place a lower limit on storage capacity implemented in the input buffer 48 and, thus, implementation associated cost, such as physical footprint.

To facilitate reducing implementation associated cost, in some embodiments, the bit-depth adjustment block 58 may process source image data using machine learning techniques. For example, as described above, the bit-depth adjustment block 58 may include a neural network 62. Additionally, as described above, implementing machine learning techniques, at least in some instances, may enable the bit-depth adjustment block 58 to determine the expected banding perceivability using smaller image pixel windows and, thus, storage capacity of the input buffer 48 to be reduced, for example, compared to traditional banding removal (e.g., gradient calculation) techniques.

Furthermore, as described above, in some embodiments, a perceivability threshold may be included in processing parameters 88, such as a set of bit-depth adjustment parameters 80. Moreover, as described above, in some embodiments, processing parameters 88 may be stored in a tangible, non-transitory, computer-readable medium, such as controller memory 86. Thus, in such embodiments, the perceivability threshold may be retrieved from the tangible, non-transitory, computer-readable medium and compared against the expected perceivability of banding that potentially results at the current image pixel. In fact, as will be described in more detail below, in some embodiments, one or more bit-depth adjustment parameters 80, such as the perceivability threshold, may be adaptively adjusted, for example, to facilitate adjusting balance between operational efficiency (e.g., operating duration and/or power consumption) and resulting image quality (e.g., likelihood and/or perceivability of banding).

When the expected banding perceivability is greater than the perceivability threshold, the bit-depth adjustment block 58 may process the source image data corresponding with the current image pixel to determine bit-depth adjusted (e.g., processed) image data with a second bit-depth (process block 112). In other words, in some embodiments, the bit-depth adjustment block 58 may determine a target (e.g., second) bit-depth of output image data 78 when the (e.g., first) bit-depth of input (e.g., source) image data 76 results in an expected banding perceivability greater than the perceivability threshold and adjust bit-depth of the input image data 76 accordingly (process block 116). As described above, in some embodiments, a target output bit-depth may be included in a set of bit-depth adjustment parameters 80 stored in a tangible, non-transitory, computer-readable medium, such as controller memory 86. Thus, in such embodiments, the target output bit-depth may be retrieved from the tangible, non-transitory, computer-readable medium.

Moreover, in some embodiments, the target output bit-depth may be pre-determined, for example, offline. Additionally or alternatively, the target output bit-depth may be determined at least in part online, for example, during operation of the bit-depth adjustment block 58 and/or its neural network 62. In fact, in some embodiments, determining the target output bit-depth in this manner may enable the bit-depth adjustment block 58 to adaptively vary output bit-depth of image data corresponding with different image pixels, which, at least in some instances, may facilitate improving operational efficiency (e.g., operating duration and/or power consumption) of the bit-depth adjustment block 58, for example, due to operational efficiency generally decreasing as the amount of bit-depth expansion increases.

Figure 10:
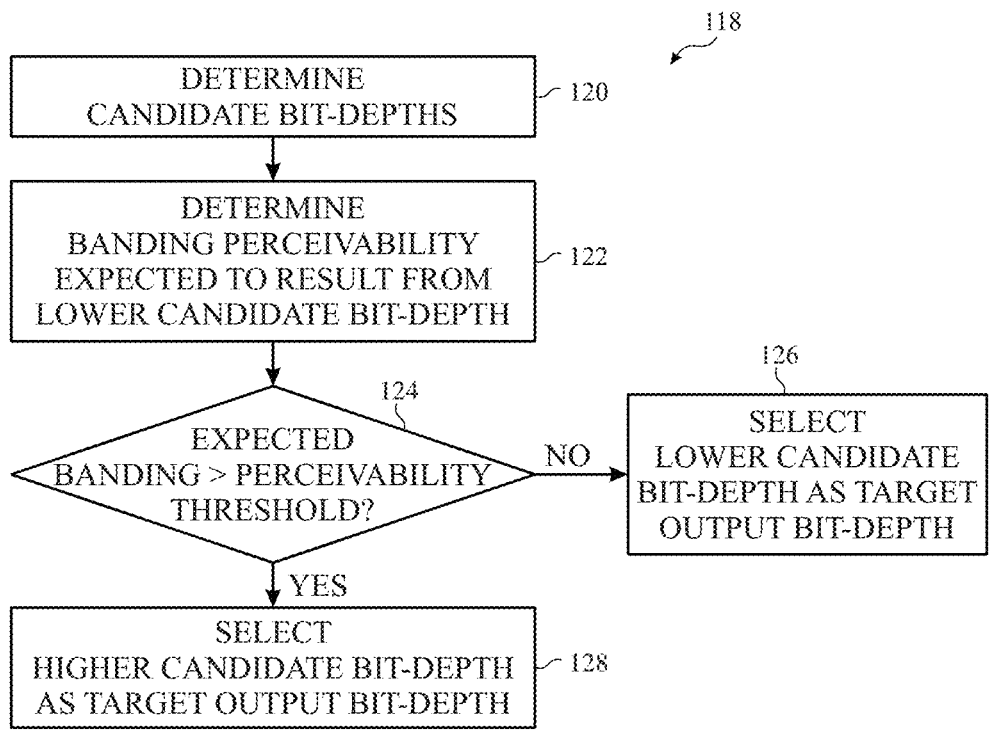
FIG. 10 is a flow diagram of an example process for adaptively adjusting a bit-depth adjustment parameter used by the bit-depth adjustment block of FIG. 7, in accordance with an embodiment of the present disclosure.

To help illustrate, an example of a process 118 for determining a target output bit-depth of a bit-depth adjustment block 58 is described in FIG. 10. Generally, the process 118 includes determining candidate bit-depths (process block 120), determining banding perceivability expected to result from a lower candidate bit-depth (process block 122), determining whether the expected banding perceivability is greater than a perceivability threshold (decision block 124), and selecting the lower candidate bit-depth as a target output bit-depth when the expected banding perceivability is not greater than the perceivability threshold (process block 126). Additionally, the process 118 includes selecting a higher candidate bit-depth as the target output bit-depth when the expected banding perceivability is greater than the perceivability threshold (process block 128).

Although described in a particular order, which represents a particular embodiment, it should be noted that the process 118 may be performed in any suitable order. Additionally, embodiments of the process 118 may omit process blocks and/or include additional process blocks. Moreover, in some embodiments, the process 118 may be implemented at least in part by executing instructions stored in a tangible, non-transitory, computer-readable medium, such as controller memory 86, using processing circuitry, such as the controller processor 84.

Accordingly, in some embodiments, a controller 42 may determine multiple candidate output bit-depths to be considered by a bit-depth adjustment block 58 (process block 120). As described above, in some embodiments, candidate output bit-depths may be indicated in a set of bit-depth adjustment parameters 80 stored in a tangible, non-transitory, computer-readable medium, such as controller memory 86. Thus, in such embodiments, the controller 42 may retrieve the candidate output bit-depths from the tangible, non-transitory, computer-readable medium. Additionally, as described above, in some embodiments, the controller 42 may configure (e.g., program) operation of an image processing block 56 at least in part by storing corresponding processing parameters 88 in one or more registers of the image processing block 56. Thus, in such embodiments, the controller 42 may store bit-depth adjustment parameters 80 indicative of the candidate output bit-depths in one or more registers of the bit-depth adjustment block 58.

Furthermore, as described above, operational efficiency (e.g., power consumption and/or operating duration) of a bit-depth adjustment block 58 generally varies with output bit-depth, for example, such that operational efficiency decreases as the output bit-depth increases. As such, in some embodiments, the candidate output bit-depths may include a lower candidate bit-depth and one or more higher candidate bit-depths. For example, the candidate output bit-depths may include a 10-bit (e.g., lower) candidate bit-depth and a 12-bit (e.g., first higher) candidate bit-depth. In some embodiments, the candidate output bit-depths may additionally or alternatively include a 14-bit (e.g., second higher) candidate bit-depth and/or a 16-bit (e.g., third higher) candidate bit-depth. Furthermore, in some embodiments, the candidate output bit-depths may be considered (e.g., evaluated) in ascending order.

In other words, using a current set of bit-depth adjustment parameters 80, the bit-depth adjustment block 58 may determine banding perceivability expected to result if source image data is expanded to the lower candidate bit-depth (process block 122). Additionally, the bit-depth adjustment block 58 may determine whether the expected banding perceivability resulting from expansion to the lower candidate bit-depth is greater than a perceivability threshold (decision block 124). As described above, in some embodiments, a perceivability threshold may be included in a set of bit-depth adjustment parameters 80 stored in a tangible, non-transitory, computer-readable medium, such as controller memory 86. Thus, in such embodiments, the perceivability threshold may be retrieved from the tangible, non-transitory, computer-readable medium and compared against the expected perceivability of banding that potentially results at a current image pixel when corresponding source image data is expanded to the lower candidate bit-depth.

Additionally, as described above, in some embodiments, a perceivability threshold may be set to facilitate balancing operational efficiency (e.g., operating duration and/or power consumption) and resulting image quality (e.g., likelihood and/or perceivability of banding). In other words, when banding perceivability expected to result from expansion to the lower candidate bit-depth is not greater than the perceivability threshold, the bit-depth adjustment block 58 may determine that expansion to the lower candidate bit-depth is expected to result in perceived image quality greater than an image quality threshold. As such, to facilitate improving operational efficiency, the bit-depth adjustment block 58 may select the lower candidate bit-depth as a target output bit-depth (process block 126).

On the other hand, when banding perceivability expected to result from expansion to the lower candidate bit-depth is greater than the perceivability threshold, the bit-depth adjustment block 58 may determine that expansion to the lower candidate bit-depth is not expected to result in perceived image quality greater than the image quality threshold. As such, to facilitate improving perceived image quality, the bit-depth adjustment block 58 may select a higher candidate bit-depth as the target output bit-depth (process block 128). As described above, in some embodiments, a bit-depth adjustment block 58 may consider multiple higher candidate bit-depths, such as a 14-bit candidate bit-depth and/or a 16-bit candidate bit-depth. In such embodiments, the bit-depth adjustment block 58 may successively consider (e.g., evaluate) higher candidate bit-depths in ascending order, thereby enabling a lowest candidate bit-depth that strikes a target balance between operational efficiency and resulting image quality to be selected as the target output bit-depth.

Returning to the process 104 of FIG. 9, as described above, the bit-depth adjustment block 58 may process source image data corresponding with the current image pixel to generate bit-depth adjusted (e.g., processed) image data with the second bit-depth when the first bit-depth of the source image data is expected to result in banding greater than the perceivability threshold. In particular, in some embodiments, the bit-depth adjustment block 58 may process the source image data to adjust (e.g., increase or expand) bit-depth of image data corresponding with the current image pixel from the first bit-depth to the target output bit-depth. Additionally, the bit-depth adjustment block 58 may output the bit-depth adjusted image data corresponding with the current image pixel when the first bit-depth of the source image data is expected to result in banding greater than the perceivability threshold (process block 114).

As described above, in some embodiments, a perceivability threshold may be set to facilitate balancing operational efficiency (e.g., operating duration and/or power consumption) and resulting image quality (e.g., likelihood and/or perceivability of banding). In other words, when banding perceivability expected to result from the source image data is not greater than the perceivability threshold, the bit-depth adjustment block 58 may determine that the first bit-depth of the source image data is expected to result in perceived image quality greater than an image quality threshold. As such, to facilitate improving operational efficiency, the bit-depth adjustment block 58 may output image data with the first bit when the source image data is not expected to result in banding greater than the perceivability threshold (process block 110). In fact, in some embodiments, the bit-depth adjustment block 58 may simply output the received source image data when the source image data is not expected to result in banding greater than the perceivability threshold, which, at least in some instances, may facilitate further improving operational efficiency, for example, by reducing processing performed by the bit-depth adjustment block 58. By operating in this manner, a bit-depth adjustment block 58 may process image data to adaptively adjust (e.g., increase or expand) bit-depth of the image data, for example, to facilitate reducing likelihood and/or perceivability of visual artifacts, such as banding, occurring in a corresponding image.

Figure 11:
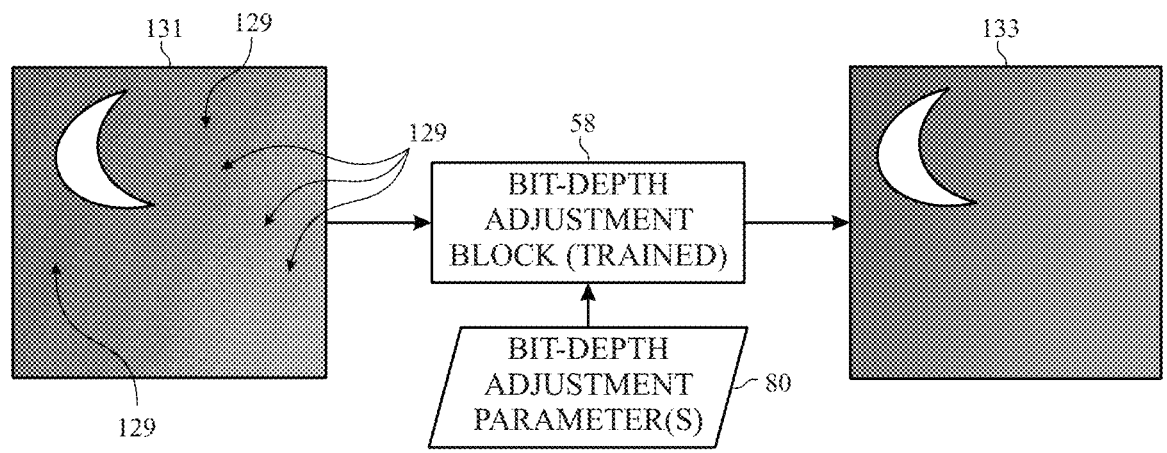
FIG. 11 is a block diagram illustrating example operation of the bit-depth adjustment block of FIG. 7, in accordance with an embodiment of the present disclosure.

To help further illustrate, a diagrammatic representation of example operation of a calibrated (e.g., trained) bit-depth adjustment block 58 is shown in FIG. 11. As depicted, the bit-depth adjustment block 58 receives input image data 76 with a first bit-depth that results in perceivable banding 129 in an input version 131 of a corresponding image. Based at least in part on the bit-depth adjustment parameters 80 (e.g., determined during a calibration process), the bit-depth adjustment block 58 may expand bit-depth of the input image data 76 to determine output image data 78 with a second (e.g., higher) bit-depth that reduces or even eliminates perceivable banding 129 in an output version 133 of the corresponding image.

Returning to the process 90 of FIG. 8, as described above, one or more image processing block 56 may be implemented in the display pipeline 36 downstream relative to the bit-depth adjustment block 58 and, thus, process output image data 78 received from the bit-depth adjustment block 58. For example, as described above, an internal format conversion block (e.g., image processing block 56) may receive image data output from the bit-depth adjustment block 58 and operate to convert the image data into an internal format, such as a signed 30-bit image data format, before further processing by one or more other downstream image processing blocks 56. As described above, in some embodiments, converting image data into the internal format before further processing may facilitate improving operational flexibility of the display pipeline 36, for example, by enabling the same image processing circuitry 27 to operate on image data received by the display pipeline 36 using different source formats.

Additionally, as described above, in some embodiments, the display pipeline 36 may include a dither block 60 implemented downstream relative to the bit-depth adjustment block 58, for example, as well as the internal format conversion block. In other words, in such embodiments, the dither block 60 may receive processed image data output from one or more upstream image processing blocks 56. However, in some embodiments, format of the processed image data received by the dither block 60 may not be directly compatible with a display panel 40 coupled to the display pipeline 36.

Thus, at least in such embodiments, the dither block 60 may dither the processed image data to convert the processed image data into a display format compatible with the display panel 40 (process block 130). For example, the dither block 60 may dither the processed image data to convert the processed image data from a signed 30-bit (e.g., internal) image data format into an unsigned 8-bit image data format compatible with the display panel 40. In particular, the dither block 60 may convert the processed image data into the display format at least in part by adding (e.g., introducing) structured noise to the processed image data, for example, instead of merely truncating the processed image data. As described above, at least in some instances, introducing structured noise may break up otherwise perceivable banding and, thus, displaying an image using dithered (e.g., processed) image data may facilitate reducing likelihood and/or perceivability of banding occurring in the image even when the dithered image data uses the same bit-depth as corresponding source image data.

To enable display of an image, processed image data corresponding with the image may be output from the display pipeline 36 to the display panel 40 (process block 98). As described above, in some embodiments, the dither block 60 may store dithered (e.g., processed) image data in an output buffer 50. Accordingly, in such embodiments, the display panel 40 may retrieve the processed image data to be used to display the image from the output buffer 50. Additionally or alternatively, the display pipeline 36 may directly output processed image data to the display panel 40 via pixel (e.g., data) stream, for example, to obviate the output buffer 50 and, thus, facilitate further reducing implementation associated cost of the display pipeline 36. In this manner, image processing circuitry 27 in the display pipeline 36 may be operated to process image data before the image data is used to display a corresponding image.

In particular, as described above, image processing circuitry 27 in the display pipeline 36 may process image data before a corresponding image is displayed to facilitate improving perceived quality of the image and, thus, potentially an electronic display 10 that is displaying the image. For example, to facilitate reducing likelihood and/or perceivability of banding occurring in the image, the bit-depth adjustment block 58 may adaptively adjust bit-depth of corresponding image data. Additionally, as described above, in some embodiments, operation of image processing circuitry 27 may be controlled (e.g., adjusted) based at least in part on corresponding processing parameters 88. For example, operation of the bit-depth adjustment block 58 may be controlled based at least in part on a set of bit-depth adjustment parameters 80.

In other words, performance (e.g., operational efficiency and/or banding removal effectiveness) of the bit-depth adjustment block 58 may be dependent at least in part on the bit-depth adjustment parameters 80 implemented therein. In fact, at least in some instances, operating the bit-depth adjustment block 58 using improper bit-depth adjustment parameters 80 may actually reduce performance, for example, due to the bit-depth adjustment block 58 unnecessarily adjusting bit-depth of input image data 76 and/or failing to identify banding expected to exceed a perceivability threshold. As such, to facilitate improving performance, in some embodiments, one or more bit-depth adjustment parameters 80 to be implemented by a bit-depth adjustment block 58 may be calibrated (e.g., tuned or trained) using a calibration (e.g., training or tuning) process, for example, performed offline before deployment and/or periodically after deployment.

Figure 12:
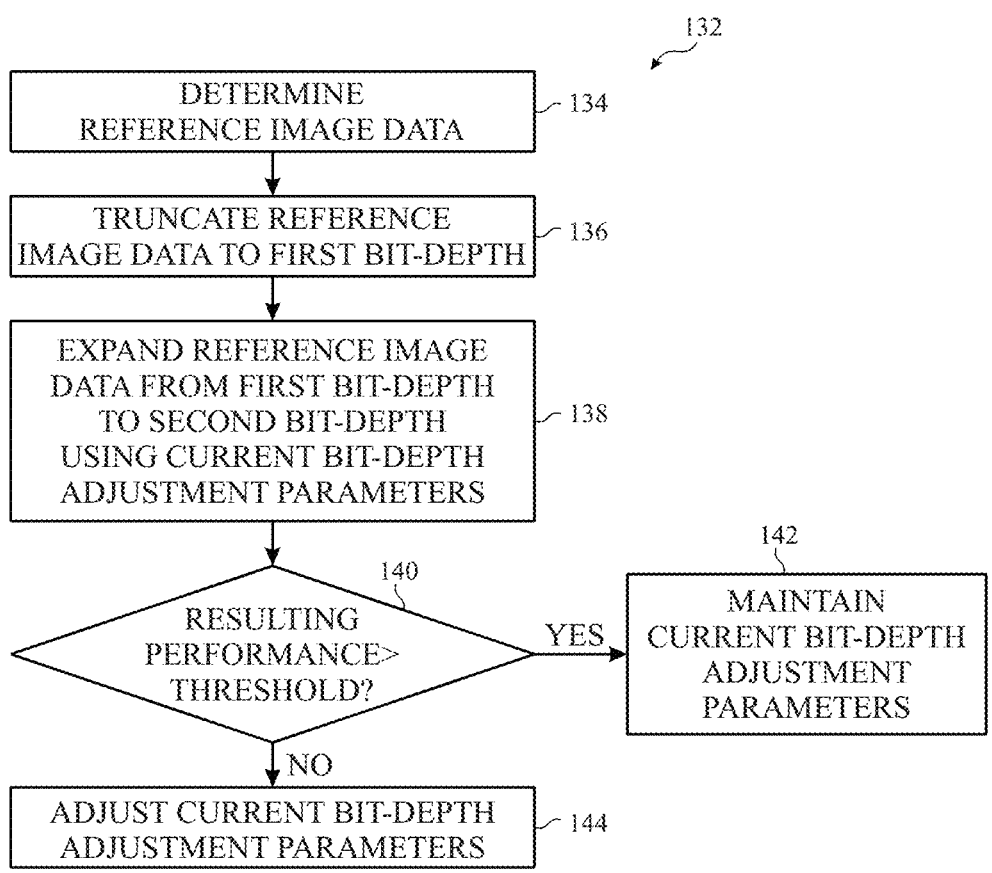
FIG. 12 is a flow diagram of an example process for calibrating the bit-depth adjustment block of FIG. 7, in accordance with an embodiment of the present disclosure.

To help illustrate, an example of a calibration (e.g., training or tuning) process 132 for a bit-depth adjustment block 58 (e.g., image processing circuitry 27) is described in FIG. 12. Generally, the calibration process 132 includes determining reference image data (process block 134), truncating the reference image data to a first bit-depth (process block 136), and expanding the reference image data from the first bit-depth to a second bit-depth using current bit-depth adjustment parameters (process block 138). Additionally, the calibration process 132 includes determining whether resulting performance is greater than a threshold (decision block 140), maintaining the current bit-depth adjustment parameters when the resulting performance is greater than the threshold (process block 142), and adjusting the current bit-depth adjustment parameters when the resulting performance is not greater than the threshold (process block 144).

Although described in a particular order, which represents a particular embodiment, it should be noted that the calibration process 132 may be performed in any suitable order. Additionally, embodiments of the calibration process 132 may omit process blocks and/or include additional process blocks. Furthermore, in some embodiments, the calibration process 132 may be implemented at least in part by executing instructions stored in a tangible, non-transitory, computer-readable medium, such as controller memory 86, using processing circuitry, such as the controller processor 84. Moreover, in some embodiments, the calibration process 132 may be implemented at least in part by a calibration system.

Figure 13:
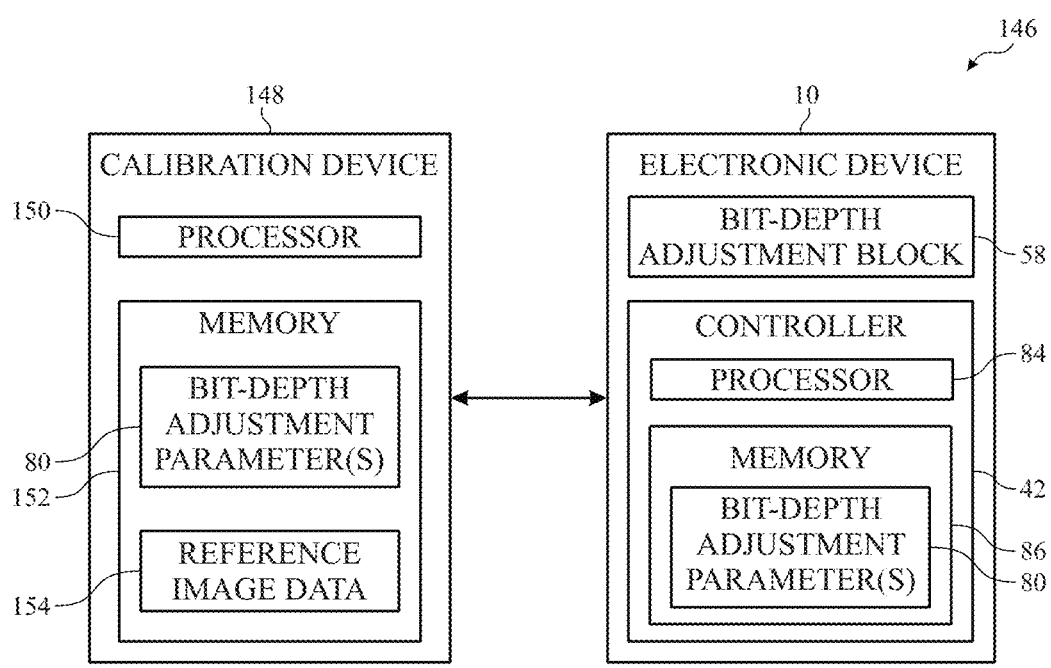
FIG. 13 is a block diagram of an example calibration system for calibrating the bit-depth adjustment block of FIG. 7, in accordance with an embodiment of the present disclosure.

To help illustrate, an example of a calibration system 146 including a bit-depth adjustment block 58 is shown in FIG. 13. As depicted, the bit-depth adjustment block 58 is implemented in an electronic device 10 along with a controller 42, which includes a controller processor 84 and controller memory 86 storing one or more bit-depth adjustment parameters 80. Additionally, as depicted, the electronic device 10 is communicatively coupled to another electronic device 10—namely a calibration device 148, for example, via a wireless communication network and/or a wired connection. In fact, in some embodiments, the calibration device 148 may be implemented at least in part using one or more cloud computing devices.

As in the depicted example, the calibration device 148 may include at least one calibration processor 150 and calibration memory 152. In some embodiments, the calibration processor 150 may include processing circuitry that executes instructions and/or processes data stored in the calibration memory 152 to determine one or more control commands, for example, which instruct the calibration device 148 to perform a control action. Additionally, in some embodiments, the calibration memory 152 may be included in a tangible, non-transitory, computer-readable medium. Thus, as in the depicted example, the calibration memory 152 may store one or more bit-depth adjustment parameters 80 and reference image data 154, which may be used to facilitate calibrating the bit-depth adjustment block 58.

Returning to the calibration process 132 of FIG. 13, a calibration system 146 may determine reference image data 154 to be used to calibrate a bit-depth adjustment block 58 (process block 134). In some embodiments, the reference image data 154 may utilize a bit-depth higher than source image data expected to be output from an image source 38. For example, when the source image data is expected to use an 8-bit bit-depth, the reference image data 154 may include 10-bit image data and/or 12-but image data. Additionally, in some embodiments, the reference image data 154 may be stored in one or more tangible, non-transitory, media, such as calibration memory 152 and/or controller memory 86.

Furthermore, the calibration system 146 may truncate the reference image data to a first bit-depth expected to be used by source image data (process block 136). For example, when the source image data is expected to use an 8-bit bit-depth, the calibration system 146 may truncate one or more least-significant-bits (LSBs) such that the reference image data is truncated down to 8-bit image data. In some embodiments, a calibration device 148 in the calibration system may truncate the reference image data 154 and supply truncated versions of the reference image data 154 to an electronic device 10 including the bit-depth adjustment block 58. Additionally, in some embodiments, the truncated versions of the reference image data 154 may be stored in an input buffer 48 communicatively coupled to the bit-depth adjustment block 58.

The calibration system 146 may then expand the truncated reference image data 154 from the first bit-depth to a second (e.g., higher) bit-depth using a current set of bit-depth adjustment parameters 80 (process block 138). In particular, in some embodiments, the bit-depth adjustment block 58 may retrieve truncated version of reference image data 154 corresponding with an image pixel window from the input buffer 48. Additionally, in some embodiments, the bit-depth adjustment block 58 may input the truncated versions into its neural network 62 to determine recovered (e.g., expanded) versions of the reference image data 154 with the second bit-depth.

In some embodiments, the second bit-depth may be determined based on bit-depth of original (e.g., un-truncated) versions of the reference image data 154. For example, when an original version utilizes a 10-bit bit-depth, the bit-depth adjustment block 58 may process a truncated (e.g., 8-bit bit depth) version of the reference image data 154 to determine a recovered version that uses a 10-bit bit-depth. Additionally or alternatively, when an original version utilizes a 12-bit bit-depth, the bit-depth adjustment block 58 may process a truncated (e.g., 8-bit bit depth) version of the reference image data 154 to determine a recovered version that uses a 12-bit bit-depth.

Furthermore, the calibration system 146 may determine whether performance (e.g., operational efficiency and/or resulting image quality) of the bit-depth adjustment block 58 using the current set of bit-depth adjustment parameters 80 satisfies one or more corresponding performance thresholds (decision block 140). As described above, in some embodiments, a bit-depth adjustment block 58 may determine one or more performance metrics 82 indicative of its performance, for example, via its neural network 62. Merely as an illustrative example, the performance metrics 82 may be indicative of operating duration and, thus, operational efficiency of the bit-depth adjustment block 58. Additionally or alternatively, the performance (e.g., feature) metrics 82 may be indicative of expected banding perceivability and, thus, perceived image quality resulting from operation of the bit-depth adjustment block 58.

Since stored therein, in some embodiments, the calibration system 146 may additionally or alternatively determine performance of the bit-depth adjustment block 58 based at least in part on the original versions of the reference image data 154. For example, the calibration system 146 may compare recovered versions of the reference image data 154 against corresponding original versions to determine distortion and, thus, perceived image quality resulting from operation of the bit-depth adjustment block 58. Additionally or alternatively, the calibration system 146 may instruct an electronic display 12 to display a recovered version of an image using the recovered version of the reference image data 154 (e.g., next to an original version of the image) to enable subjective user determination of perceived image quality.

When greater than the performance threshold, the calibration system 146 may determine that operation of the bit-depth adjustment block 58 using the current set of bit-depth adjustment parameters 80 is satisfactory and, thus, maintain the current set of bit-depth adjustment parameters 80 (process block 142). On the other hand, when not greater than one or more performance thresholds, the calibration system 146 may adjust the value of one or more bit-depth adjustment parameters 80 included in the current set of bit-depth adjustment parameters (process block 144). For example, the calibration system 146 may adjust the value of the perceivability threshold to facilitate adjusting a target balance between operational efficiency of the bit-depth adjustment block 58 and resulting image quality.

In some embodiments, the calibration device 148 may determine adjusted values of one or more bit-depth adjustment parameters 80 and update the set of bit-depth adjustment parameters 80 stored in the electronic device 10 accordingly. As described above, in some embodiments, the bit-depth adjustment block 58 may autonomously adjust the value of one or more bit-depth adjustment parameters 80, for example, by selecting different target output bit-depths for different image data. Additionally or alternatively, the value of one or more bit-depth adjustment parameters 80 may be manually adjusted, for example, via one or more user inputs received via an input device 14.

Figure 14:
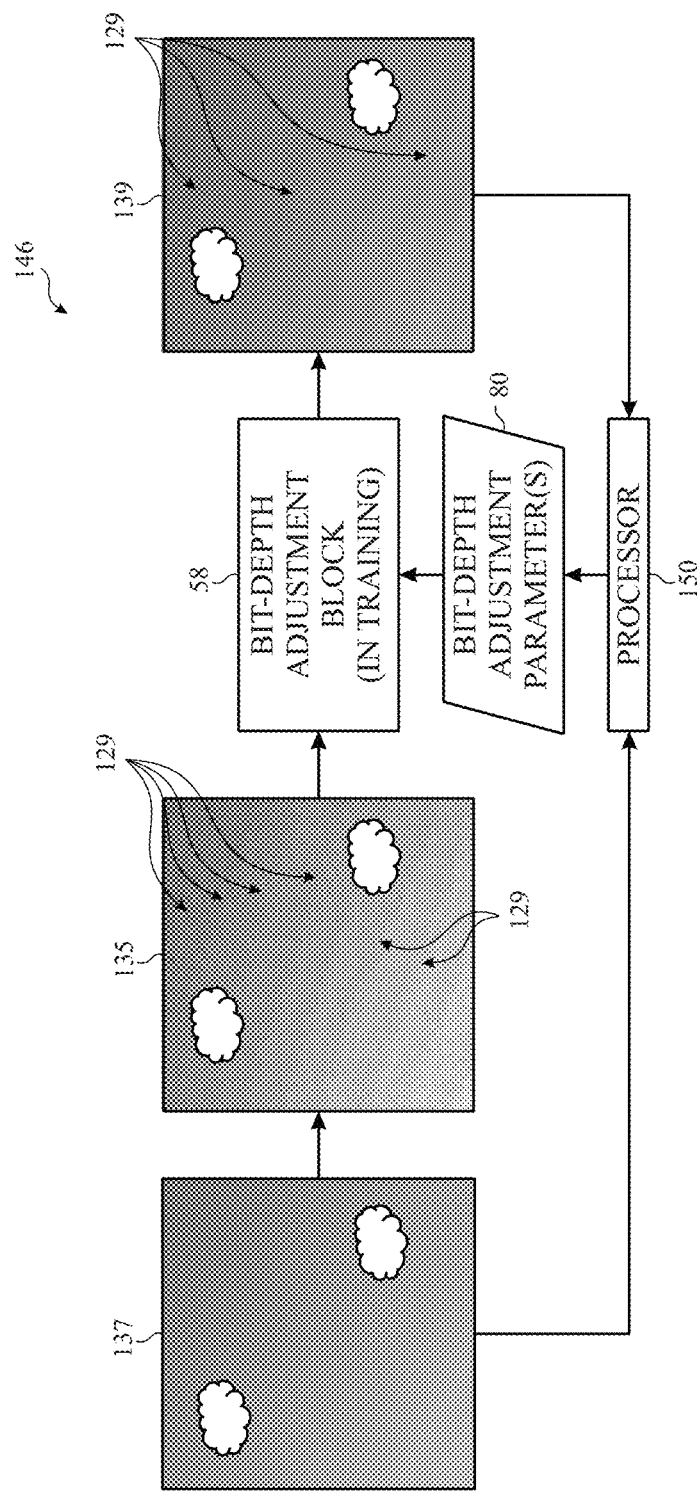
FIG. 14 is a block diagram illustrating example operation of the calibration system of FIG. 13, in accordance with an embodiment of the present disclosure.

To help further illustrate, a diagrammatic representation of example operation of a calibration system 146 is shown in FIG. 14. As depicted, the bit-depth adjustment block 58 receives input image data 76 corresponding with an input (e.g., truncated) version 135 of a reference image. As described above, in some embodiments, a calibration system 146 may determine the input image data 76 by truncating reference image data 154 corresponding with an original version 137 of the reference image from a higher bit-depth to a lower bit-depth. As in the depicted example, truncating to the lower bit-depth may result in perceivable banding in the input (e.g., truncated) version 135 of the reference image.

Based at least in part on a current set of bit-depth adjustment parameters 80, the bit-depth adjustment block 58 may expand bit-depth of the input image data 76 to the higher bit-depth to determine output image data 78 corresponding with a recovered version 139 of the reference image. As described above, in some embodiments, a calibration processor 150 may evaluate performance of the bit-depth adjustment block 58 resulting from a current set of bit-depth adjustment parameters 80 based at least in part on the recovered version 139 of a reference image. For example, the calibration processor 150 may compare the recovered version 139 of the reference image against the original version 137 of the reference image and adjust the value of one or more bit-depth adjustment parameters 80 in an effort to bring the recovered version 139 closer to the original version 137.

In this manner, operation of a bit-depth adjustment block may be calibrated (e.g., tuned or trained) to facilitate striking a target balance between operational efficiency (e.g., power consumption and/or operating duration) and resulting image quality (e.g., banding perceivability and/or banding removal effectiveness). In other words, as described above, the techniques described in the present disclosure may facilitate improving perceived quality of a displayed image and, thus, potentially an electronic display that is displaying the image. Moreover, as described above, the techniques described in the present disclosure may facilitate improving perceived image quality with reduced implementation associated cost and/or improved operational efficiency, for example, by implementing machine learning techniques (e.g., a neural network) that enable adaptively adjusting bit-depth using smaller image pixel windows and, thus, a smaller input buffer.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. A system comprising a display pipeline configured to be communicatively coupled to an electronic display, wherein the display pipeline comprises:
   an input buffer configured to store input image data corresponding with a window of image pixels in an image, wherein the input image data has a first bit-depth and comprises first image data corresponding with a first image pixel in the window of image pixels; and
   bit-depth adjustment circuitry coupled to the input buffer, wherein the bit-depth adjustment circuitry comprises a neural network configured to operate based at least in part on a set of bit-depth adjustment parameters to:
   process the input image data corresponding with the window of image pixels without explicitly determining gradient in the window of image pixels to determine whether a banding visual artifact greater than a perceivability threshold is expected to result at a display pixel corresponding with the first image pixel when the image is displayed directly using the input image data with the first bit-depth; and
   process the first image data corresponding with the first image pixel in the window of image pixels to expand the first image data from the first bit-depth to a second bit-depth greater than the first bit-depth when the banding visual artifact expected to result from displaying the image directly using the input image data with the first bit-depth is greater than the perceivability threshold.

2. The system of claim 1, comprising:
   an electronic device, wherein the electronic device comprises the display pipeline; and
   a calibration device communicatively coupled to the electronic device, wherein the calibration device is configured to:
   determine reference image data corresponding with the window of image pixels, wherein the reference image data has the second bit-depth;
   determine the input image data corresponding with the window of image pixels at least in part by truncating the reference image data from the second bit-depth to the first bit-depth;
   determine performance of the bit-depth adjustment circuitry resulting from operation using the set of bit-depth adjustment parameters based at least in part on a comparison of the reference image data corresponding with the first image pixel and the first image data output from the neural network with the second bit-depth; and
calibrate the set of bit-depth adjustment parameters to be subsequently implemented by the bit-depth adjustment circuitry based at least in part on the performance of the bit-depth adjustment circuitry.

3. The system of claim 2, wherein the calibration device is configured to calibrate the set of bit-depth adjustment parameters at least in part by:
maintaining current value of the set of bit-depth adjustment parameters when the performance of the bit-depth adjustment circuitry is greater than a performance threshold; and
adjusting the current value of one or more bit-depth adjustment parameters included in the set of bit-depth adjustment parameters when the performance of the bit-depth adjustment circuitry is not greater than the performance threshold.

4. The system of claim 2, wherein:
the reference image data comprises 10-bit image data, 12-bit image data, 14-bit image data, 16-bit image data, or any combination thereof; and
the input image data comprises 8-bit image data.

5. The system of claim 2, wherein the electronic device comprises a computer, a mobile phone, a portable media device, a tablet device, a television, a handheld game platform, a personal data organizer, a virtual-reality headset, a mixed-reality headset, or a vehicle dashboard.

6. The system of claim 1, wherein:
the input image data comprises 8-bit image data; and
the first image data having the second bit-depth comprises 10-bit image data, 12-bit image data, 14-bit image data, 16-bit image data, or any combination thereof.

7. The system of claim 1, wherein:
the set of bit-depth adjustment parameters indicate a target size of the window of image pixels; and
the bit-depth adjustment circuitry is configured to retrieve the input image data corresponding with the window of image pixels from the input buffer based at least in part on the target size indicated in the set of bit-depth adjustment parameters.

8. The system of claim 1, wherein:
the input image data corresponding with the window of image pixels comprises second image data corresponding with a second image pixel in the window of image pixels; and
the bit-depth adjustment circuitry is configured to process the second image pixel before processing the first image pixel.

9. The system of claim 1, wherein the display pipeline comprises:
an output buffer configured to be communicatively coupled to a display panel of the electronic display; and
other image processing circuitry coupled between the bit-depth adjustment circuitry and the output buffer, wherein the other image processing circuitry is configured to:
process image data output from the bit-depth adjustment circuitry to determine processed image data corresponding with the image; and
store the processed image data in the output buffer to enable the display panel to retrieve the processed image data from the output buffer and display the image at least in part by controlling light emission from its display pixels.

10. The system of claim 9, wherein the other image processing circuitry comprises dither circuitry configured to dither the processed image data back to the first bit-depth before storage in the output buffer.

11. The system of claim 1, wherein bit-depth adjustment circuitry is configured to selectively vary bit-depth of the first image data based on adjusting the bit-depth of a portion of the input image data to a first bit-depth and adjusting the bit-depth of another portion of the input image data to a second bit-depth.

12. A method of operating image processing circuitry, comprising:
receiving, using the image processing circuitry, source image data having an input bit-depth, wherein the source image data corresponds with an image to be displayed on an electronic display; and
processing, using the image processing circuitry, the source image data to generate processed image data to be used by the electronic display to display the image, wherein processing the source image data comprises:
determining whether perceivable banding is expected to result at a first display pixel of the electronic display when the image is displayed on the electronic display directly using the source image data; and
when the perceivable banding is expected to result at the first display pixel:
selecting a first target bit-depth from multiple candidate bit-depths; and
expanding the source image data corresponding with the first display pixel from the input bit-depth to the first target bit-depth to facilitate generating the processed image data corresponding with the first display pixel; and
when the perceivable banding is not expected to result at the first display pixel:
maintaining the source image data corresponding with the first display pixel based on the input bit-depth to facilitate generating the processed image data corresponding with the first display pixel.

13. The method of claim 12, wherein selecting the first target bit-depth comprises:
determining a lower candidate bit-depth and a higher candidate bit-depth;
determining perceivability of banding expected to result at the first display pixel when the electronic display displays the image using image data generated at least in part by expanding the source image data corresponding with the first display pixel from the input bit-depth to the lower candidate bit-depth;
selecting the lower candidate bit-depth as the first target bit-depth when the perceivability of banding expected to result at the first display pixel is not greater than a perceivability threshold; and
selecting the higher candidate bit-depth as the first target bit-depth when the perceivability of banding expected to result at the first display pixel is greater than the perceivability threshold.

14. The method of claim 12, wherein processing the source image data comprises inputting the source image data into a neural network.

15. The method of claim 12, wherein processing the source image data comprises:
determining whether perceivable banding is expected to result at a second display pixel of the electronic display when the image is displayed on the electronic display directly using the source image data; and when perceivable banding is expected to result at the second display pixel:
selecting a second target bit-depth different from the first target bit-depth from the multiple candidate bit-depths; and
expanding the source image data corresponding with the second display pixel from the input bit-depth to the second target bit-depth to facilitate generating the processed image data corresponding with the second display pixel.

16. The method of claim 15, wherein:
selecting the first target bit-depth comprises selecting a 10-bit bit-depth; and
selecting the second target bit-depth comprises selecting a 12-bit bit-depth.

17. The method of claim 12, comprising storing, using the image processing circuitry, the processed image data in an output buffer communicatively coupled between the image processing circuitry and a display panel of the electronic display, wherein:
receiving the source image data comprises retrieving the source image data from an input buffer communicatively coupled between the image processing circuitry and an image source; and
processing the source image data to generate the processed image data comprises dithering the processed image data to an output bit-depth that matches the input bit-depth of the source image data.

18. A tangible, non-transitory, computer-readable medium storing instructions executable by one or more processors in a calibration system, wherein the instructions comprise instructions to:
determine, using the one or more processors, source bit-depth of source image data to be output from an image source;
determine, using the one or more processors, an original version of reference image data that uses a reference bit-depth greater than the source bit-depth;
truncate, using the one or more processors, the reference image data from the reference bit-depth to the source bit-depth to generate a truncated version of the reference image data;
supply, using the one or more processors, the truncated version of the reference image data to bit-depth adjustment circuitry to enable a neural network implemented in the bit-depth adjustment circuitry to determine a recovered version of the reference image data at least in part by expanding the truncated version of the reference image data back to the reference bit-depth; and
calibrate, using the one or more processors, a set of bit-depth adjustment parameters used by the bit-depth adjustment circuitry to expand the truncated version of the reference image data based at least in part on determining a banding perceivability, wherein the banding perceivability is based at least in part on a comparison between the recovered version of the reference image data and the original version of the reference image data, and wherein the instructions to calibrate the set of bit-depth adjustment parameters comprise instructions to:
maintain a current value of the set of bit-depth adjustment parameters when the banding perceivability is not greater than a perceivability threshold; and
adjust the current value of one or more bit-depth adjustment parameters included in the set of bit-depth adjustment parameters when the banding perceivability is greater than the perceivability threshold.

19. The tangible, non-transitory, computer-readable medium of claim 18, wherein the instructions to the truncated version of the reference image data to the bit-depth adjustment circuitry comprises instructions to store the truncated version of the reference image data in an input buffer coupled to the bit-depth adjustment circuitry to enable the bit-depth adjustment circuitry to retrieve the truncated version of the reference image data from the input buffer.

20. The tangible, non-transitory, computer-readable medium of claim 18, wherein the instructions comprise instructions to selectively vary bit-depth of the source image data based on adjusting the bit-depth of a portion of the reference image data to a first bit-depth and adjusting the bit-depth of another portion of the reference image data to a second bit-depth.

* * * * *